United States Patent [19]
Osato

[11] Patent Number: 5,604,046
[45] Date of Patent: Feb. 18, 1997

[54] MAGNETO-OPTICAL RECORDING MEDIUM AND A METHOD USING THE SAME

[75] Inventor: Yoichi Osato, Yokohama, Japan

[73] Assignee: Canon Kabushiki Kaisha, Tokyo, Japan

[21] Appl. No.: 195,061

[22] Filed: Feb. 14, 1994

Related U.S. Application Data

[63] Continuation of Ser. No. 659,279, Feb. 22, 1991, abandoned.

[30] Foreign Application Priority Data

Feb. 23, 1990 [JP] Japan .................. 2-41323
Mar. 13, 1990 [JP] Japan .................. 2-59901

[51] Int. Cl.⁶ ..................................... G11B 5/66
[52] U.S. Cl. .................. 428/694 ML; 428/694 MM; 428/694 EC; 428/694 GR; 428/694 RL; 428/694 DE; 428/336; 428/900; 360/59; 360/114; 365/122; 369/13; 369/14; 369/54; 369/59; 369/116; 369/121; 369/122; 369/124
[58] Field of Search .................. 360/114, 59; 365/122; 369/54, 13, 116, 59, 14, 121, 122, 124; 428/900, 694 ML, 694 MM, 694 EC, 694 GR, 694 RL, 694 DE, 336

[56] References Cited

U.S. PATENT DOCUMENTS

| | | | |
|---|---|---|---|
| 4,556,291 | 12/1985 | Chen | 350/377 |
| 4,649,519 | 3/1987 | Sun et al. | 365/122 |
| 4,855,975 | 8/1989 | Akasaka et al. | 369/13 |
| 4,878,132 | 11/1989 | Aratani et al. | 360/59 |
| 5,132,945 | 7/1992 | Osato et al. | 369/13 |
| 5,163,031 | 11/1992 | Osato | 369/13 |

FOREIGN PATENT DOCUMENTS

| | | |
|---|---|---|
| 0258978 | 3/1988 | European Pat. Off. . |
| 60-243840 | 12/1985 | Japan . |

*Primary Examiner*—Leszek Kiliman
*Attorney, Agent, or Firm*—Fitzpatrick, Cella, Harper & Scinto

[57] ABSTRACT

This specification discloses a magneto-optical recording medium in which on the opposite side of a second magnetic layer having a relatively low curie temperature and a relatively great coercive force, there are laminated a first magnetic layer and a third magnetic layer each having a relatively high curie temperature and a relatively small coercive force as compared with the second magnetic layer, the second magnetic layer has its curie temperature varying in the direction of film thickness thereof and has a curie temperature $T_{L1}$ near the interface thereof with the first magnetic layer and has a curie temperature $T_{L3}$ near the interface thereof with the third magnetic layer, and $T_{L1} \neq T_{L3}$, and the first magnetic layer, the second magnetic layer and the third magnetic layer are coupled together at room temperature by the exchange interaction therebetween and a state in which the direction of magnetization of the first magnetic layer and the direction of magnetization of the third magnetic layer are anti-parallel to each other is a stable state. The specification also discloses a magneto-optical recording method using such magneto-optical recording medium.

20 Claims, 9 Drawing Sheets

MAGNETO-OPTICAL RECORDING MEDIUM AND A METHOD USING THE SAME

This application is a continuation of application Ser. No. 07/659,279, filed Feb. 22, 1991, now abandoned.

BACKGROUND OF THE INVENTION

1. Field of the Invention

This invention relates to a magneto-optical recording medium capable of overwriting from which recorded information can be read out by the utilization of the magnetic Kerr effect and a recording method using the same medium.

2. Related Background Art

A magneto-optical memory is known as an erasable optical memory. The magneto-optical memory, as compared with a magnetic recording medium using a magnetic head, has the advantage that high-density recording and non-contact recording and reproduction are possible. However, to record information on such a magneto-optical memory, it has generally been necessary to erase (magnetize in one direction) recorded portions before recording.

So, there has been proposed a system in which a recording-reproducing head and an erasing head are provided discretely, or a system whereby recording is effected while a continuous laser beam is applied and at the same time, a magnetic field applied is modulated. However, the former recording system suffers from the disadvantage that the apparatus therefor is large-scaled and costly. The latter recording system suffers from a disadvantage which spoils the original merit of magneto-optical recording, such as high-speed modulation being impossible when a great magnetic field is applied, head crash being caused by the contact between the rotating medium and the magnetic head when the magnetic head is brought close to the surface of the medium for the purpose of high-speed modulation, or the magnetic head being readily affected by dust adhering to the surface of the medium.

So, there has been thought out a method of realizing overwriting by two kinds of recording, i.e., recording in which use is made of a vertically magnetized film of two-layer structure comprising a magnetic layer great in coercive force and low in curie temperature and a magnetic layer small in coercive force and high in curie temperature and a relatively great magnetic field is applied to the film to thereby uniformly magnetize only the layer small in coercive force in one direction and thereafter great laser power is applied to the film to thereby reverse the magnetization of this layer, or recording in which relatively small laser power is applied to the film and without the reversal of the magnetization of the layer small in coercive force and high in curie temperature being effected, the magnetization of the layer great in coercive force and low in curie temperature is uniformly magnetized in the direction of magnetization of the layer small in coercive force (U.S. Ser. No. 71,190).

However, in the above-described recording method using the conventional vertically magnetized film of two-layer structure, there is a recorded state in which a magnetic wall is present between the two magnetic layers and therefore, there is a problem in the stability of recording bits, and there is also the disadvantage that the magnetic field generating portion for uniformly magnetizing in one direction the layer small in coercive force becomes large-scaled.

SUMMARY OF THE INVENTION

The present invention has been made in view of the above-noted problems and an object thereof is to eliminate the above-noted disadvantages peculiar to the prior art and to provide a magneto-optical recording medium capable of overwriting like a magnetic recording medium and a recording method using such medium.

The above object is achieved by a magneto-optical recording medium in which on the opposite sides of a second magnetic layer having a relatively low curie temperature and a relatively great coercive force, there are laminated a first magnetic layer and a third magnetic layer each having a relatively high curie temperature and a relatively small coercive force as compared with said second magnetic layer, said second magnetic layer has its curie temperature varying in the direction of film thickness thereof and has a curie temperature $T_{L1}$ near the interface thereof with said first magnetic layer and has a curie temperature $T_{L3}$ near the interface thereof with said third magnetic layer, and $T_{L1} \neq T_{L3}$, and said first magnetic layer, said second magnetic layer and said third magnetic layer are coupled together at room temperature by the exchange interaction therebetween and a state in which the direction of magnetization of said first magnetic layer and the direction of magnetization of said third magnetic layer are anti-parallel to each other is a stable state.

Also, the above object is achieved by a magneto-optical recording method which uses a magneto-optical recording medium in which on the opposite sides of a second magnetic layer having a relatively low curie temperature and a relatively great coercive force, there are laminated a first magnetic layer and a third magnetic layer each having a relatively high curie temperature and a relatively small coercive force as compared with said second magnetic layer, said second magnetic layer has its curie temperature varying in the direction of film thickness thereof and has a curie temperature $T_{L1}$ near the interface thereof with said first magnetic layer and has a curie temperature $T_{L3}$ near the interface thereof with said third magnetic layer, and $T_{L1} \neq T_{L3}$, and said first magnetic layer, said second magnetic layer and said third magnetic layer are coupled together at room temperature by the exchange interaction therebetween and a state in which the direction of magnetization of said first magnetic layer and the direction of magnetization of said third magnetic layer are anti-parallel to each other is a stable state, and which applies laser power to said medium from one surface thereof while applying a bias magnetic field $H_B$ in a predetermined direction to said medium at the position of a recording head, thereby effecting the following two-value recording:

(a) a first kind of recording in which laser power enough for said medium to rise in temperature to the vicinity of lower one of the curie temperature $T_{L1}$ and the curie temperature $T_{L3}$ is applied to said medium, whereby the direction of magnetization of one of the first magnetic layer and the third magnetic layer which is not on that side of said medium on which the laser power impinges is uniformized in the direction of said bias magnetic field $H_B$ and the direction of magnetization of said second magnetic layer is uniformized in a direction stable relative to the direction of magnetization of said one magnetic layer; and (b) a second kind of recording in which laser power enough for said medium to rise in temperature to the vicinity of the higher one of the curie temperature $T_{L1}$ and the curie temperature $T_{L3}$ is applied to said medium, whereby the direction of magnetization of one of the first magnetic layer and the third magnetic layer which is on that side of said medium on which the laser power impinges is uniformly magnetized in the direction of said bias magnetic field $H_B$ and the direction of magnetization of said second magnetic layer is uniformly magnetized in a direction stable relative to the direction of magnetization of said one magnetic layer.

DETAILED DESCRIPTION OF THE PREFERRED EMBODIMENTS

Some embodiments of the present invention will hereinafter be described with reference to the drawings.

Figure 1:
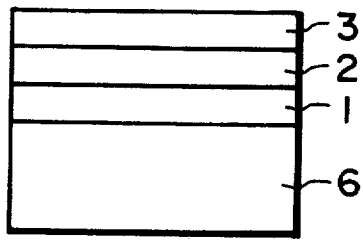
FIG. 1 shows a first embodiment of the magneto-optical recording medium of the present invention.

FIG. 1 is a schematic cross-sectional view showing a first embodiment of the magneto-optical recording medium of the present invention.

The magneto-optical recording medium shown in FIG. 1 comprises a first magnetic layer 1, a second magnetic layer 2 and a third magnetic layer 3 laminated in succession on a light-transmitting substrate 6.

The curie temperatures and the coercive forces at room temperature of the respective magnetic layers in the present invention can satisfy conditions which will be described later, and the optimum values thereof differ depending on various conditions and therefore cannot absolutely be said. However, the curie temperature $T_{H1}$ of the first magnetic layer may desirably be of the order of 100°–400° C., and may more preferably be 150°–300° C. The coercive force $H_{L1}$ at room temperature of the first magnetic layer may desirably be of the order of 0.05–3 kOe, and may more preferably be 0.1–0.5 kOe. The curie temperature $T_L$ of the second magnetic layer may desirably be of the order of 70°–300° C., and may more preferably be 100°–250° C. The coercive force $H_H$ at room temperature of the second magnetic layer may desirably be 3 kOe or more, and may more preferably be 5 kOe or more. The difference between the curie temperature $T_{L1}$ near the interface of the second magnetic layer with the first magnetic layer and the curie temperature $T_{L3}$ near the interface of the second magnetic layer with the third magnetic layer may desirably be of the order of 10°–150° C., and may more preferably be 30°–100° C. The curie temperature $T_{H3}$ of the third magnetic layer may desirably be of the order of 100°–400° C., and may more preferably be 150°–300° C. The coercive force $H_{L3}$ at room temperature of the third magnetic layer may desirably be of the order of 0.05–3 kOe, and may more preferably be 0.1–0.5 kOe.

As the materials of the magnetic layers, utilization can be made of materials which exhibit vertical magnetic anisotropy and have a relatively great magneto-optical effect, but amorphous alloys of rare earth elements and transition elements having relatively small vertical magnetic anisotropy, such as Ga—Fe, Gd—Fe—Co, Gd—Co, Gd—Ho—Fe, Gd—Ho—Fe—Co, Gd—Ho—Co, Gd—Dy—Fe, Gd—Dy—Fe—Co and Gd—Dy—Co are preferably for the first magnetic layer and the third magnetic layer. Also, amorphous alloys of rare earth elements and transition elements having relatively great vertical magnetic anisotropy, such as Tb—Fe, Tb—Dy—Fe, Dy—Fe, Tb—Fe—Co, Tb—Dy—Fe—Co and Dy—Fe—Co are preferable for the second magnetic layer.

In the magneto-optical recording medium of the present invention, the first magnetic layer and the second magnetic layer are exchange-coupled together and the second magnetic layer and the third magnetic layer are exchange-coupled together, and the second magnetic layer is relatively great in coercive force and relatively low in curie temperature as compared with the first magnetic layer and the third magnetic layer. Also, the second magnetic layer has its curie temperature varying in the direction of film thickness thereof, that is, has a gradient in its curie temperature. The first magnetic layer and the third magnetic layer have relatively high curie temperature.

Also, in the first magnetic layer and the third magnetic layer, the state in which the directions of magnetization thereof are anti-parallel to each other is a stable state in which no magnetic wall is present between these layers.

Two-value recording effected on the magneto-optical recording medium of the first embodiment of the present invention will now be described with reference to FIG. 2. In this example, a state in which the directions of magnetization of the first magnetic layer 1 and the second magnetic layer 2 are anti-parallel to each other at room temperature by the exchange interaction is stable. At this time, the directions of magnetization of the first magnetic layer 1 and the third magnetic layer 3 are anti-parallel to each other and therefore, a state in which the directions of magnetization of the second magnetic layer 2 and the third magnetic layer 3 are parallel to each other is stable. When the curie temperature $T_{L1}$ near the interface of the second magnetic layer 2 with the first magnetic layer 1 is compared with the curie temperature $T_{L3}$ near the interface of the second magnetic layer 2 with the third magnetic layer 3, $T_{L1} > T_{13}$.

For description, it is to be understood that the direction of a bias magnetic field $H_B$ applied from the outside is the direction from the first magnetic layer 1 toward the third magnetic layer 3. As a matter of course, if the direction of the bias magnetic field $H_B$ is opposite, the directions of magnetization of the magnetic layers 1, 2 and 3 in magnetized states (a)–(i) as they are all reversed explain the then recording process. The bias magnetic field $H_B$ has enough intensity to orient the directions of magnetization of the first magnetic layer 1 and the third magnetic layer 3 to the direction of this bias magnetic field $H_B$ at a recording temperature which will be described later.

Description will first be made of magnetized states indicated by (a)–(i) in FIG. 2 and the shift process between the magnetized states.

(a) and (g) indicate the magnetized states at room temperature corresponding to two kinds of recording states, and stable magnetized states by the exchange interaction. This magneto-optical recording medium can be caused to rise in temperature by applying a laser beam thereto from the outside, and here, it is to be understood that the laser beam is applied to the recording medium from the side of the first magnetic layer 1. The magnetized states when the temperature of the medium (the temperature mentioned here refers to the temperature of the second magnetic layer, and this also holds true hereinafter) is somewhat lower than $T_{L3}$ are indicated by (b), (f) and (h), the magnetized states when the temperature is in the vicinity of $T_{L3}$ are indicated by (c), (e) and (i), and the magnetized state when the temperature has further risen to the vicinity of $T_{L1}$ is indicated by (d). The magnetized state at each temperature as will be described later, is fixed at only one state depending on whether the medium is in the temperature-rising process in which the temperature of the medium is rising with the laser beam applied thereto or whether the medium is in the temperature-falling process in which the temperature of the medium is falling with the application of the laser beam terminated, and the magnetized state at room temperature before the temperature rise.

Here, the magnetized states (i) and (e) will be described. The states (i) and (e) differ from each other in that (i) is in the temperature-rising process and (e) is in the temperature-falling process. The laser beam enters from the first magnetic layer 1 side and therefore, comparing the temperature of the first magnetic layer 1 at a point of time whereat an interfacial magnetic wall 20 has been formed near the interface of the second magnetic layer 2 with the third magnetic layer 3 between the states (i) and (e), the temperature is higher in the state (i) in which the medium is in the temperature-rising process than in the state (e) in which the medium is in the temperature-falling process. This is because when the laser beam is being applied to the medium, the first magnetic layer is greatest in the absorption of the laser beam and is merely heated thereby and therefore is higher in temperature than the other layers, but when the laser beam is not being applied to the medium, that is, in the temperature-falling process, the cooling of the first magnetic layer which is highest in temperature progresses faster than in the other layers and after all, the first magnetic layer falls to substantially the same temperature as that of the third magnetic layer.

The formation of the interfacial magnetic wall 20 is by the interaction between the second magnetic layer and the third magnetic layer and therefore, the temperature of the third magnetic layer at this point of time is substantially equal between the states (i) and (e).

Also, the magnetized states (i) and (e) are unstable states due to the exchange interaction because the directions of magnetization of the first magnetic layer 1 and the third magnetic layer 3 are parallel to each other. When the medium is cooled from these states into a stable state, the recording medium of the present invention and conditions may be suitably set as will be described later so that since the temperature of the first magnetic layer 1 is relatively high as compared with the other layers, the direction of magnetization of the first magnetic layer 1 may be reversed from the magnetized state (i) and the direction of magnetization of the third magnetic layer 3 may be reversed from the magnetized state (e).

That is, the recording medium is set so as to satisfy $$\frac{\sigma_{23}}{2(M_{s(2)}h_2 + M_{s(1)}h_1)} > H_{c(2)} + H_B$$

$$\frac{\sigma_{23}}{2M_{s(3)}h_3} < H_{c(3)} + H_B$$

at the vicinity of the temperature $T_{L3}$ during the temperature rise, and to satisfy $$\frac{\sigma_{23}}{2(M_{s(2)}h_2 + M_{s(1)}h_1)} < H_{c(2)} + H_B$$

$$\frac{\sigma_{23}}{2M_{s(3)}h_3} > H_{c(3)} + H_B$$

at the vicinity of the temperature $T_{L3}$ during the temperature fall.

In the foregoing, $\sigma_{23}$ is the interfacial magnetic wall energy between the second magnetic layer and the third magnetic layer, $M_{s(1)}$, $M_{s(2)}$ and $M_{s(3)}$ are saturated magnetizations of the first magnetic layer, the second magnetic layer and the third magnetic layer, respectively, and $h_1$, $h_2$ and $h_3$ are the film thicknesses of the first magnetic layer, the second magnetic layer and the third magnetic layer, respectively.

Also, $H_{c(2)}$ and $H_{c(3)}$ are the coercive forces of the second magnetic layer and the third magnetic layer, respectively, at the vicinity of the temperature $T_{L3}$.

The recording process will now be described.

As the medium rises in temperature from the magnetized state (a) at room temperature, the coercive force of the second magnetic layer 2 gradually decreases and the medium comes to the magnetized state (c) at a temperature in the vicinity of the curie temperature $T_{L3}$ (a temperature at which a first kind of recording is effected), via the magnetized state (b). When the medium falls in temperature from this state, the coercive force of the second magnetic layer 2 increases and the medium reversibly restores the state (a). When the medium further rises in temperature from the magnetized state (c) and reaches a temperature in the vicinity of the curie temperature $T_{L1}$ (a temperature at which a second kind of recording is effected), the medium assumes the magnetized state (d). At this temperature, the vicinity of the interface of the second magnetic layer 2 with the third magnetic layer 3 exceeds the curie temperature and therefore, this portion becomes a normal magnetic layer 21 and the coercive force of the second magnetic layer 2 as a whole approximates to zero and thus, the direction of magnetization of the first magnetic layer 1 is reversed into a downward direction by the bias magnetic field $H_B$ and simultaneously therewith, the direction of magnetization of the second magnetic layer 2 near the interface thereof with the first magnetic layer 1 is also reversed into an upward direction.

When the temperature is reduced from this magnetized state (d) to a temperature in the vicinity of the curie temperature $T_{L3}$, the magnetization of the second magnetic layer 2 becomes great, and near the interface thereof with the first magnetic layer 1, the second magnetic layer assumes the magnetized state (e) which exhibits a great coercive force. At this temperature, the vicinity of the interface of the second magnetic layer 2 with the third magnetic layer 3 again assumes the curie temperature or below, and the directions of magnetization of the second magnetic layer 2 and the third magnetic layer 3 are anti-parallel to each other and unstable and therefore, an interfacial magnetic wall 20 is formed near said interface. When the temperature is further reduced, the temperature of the first magnetic layer 1 is not high as compared with the other layers because now is the temperature-falling process, and the first magnetic layer 1 and the second magnetic layer 2 are strongly exchange-coupled together and also, the coercive force of the vicinity of the interface of the second magnetic layer 2 with the first magnetic layer 1 is sufficiently great and therefore, the direction of magnetization of the third magnetic layer 3 is reversed into an upward direction and the interfacial magnetic wall 20 disappears, and the medium assumes the stable magnetized state (f). When the temperature further falls to room temperature, the medium assumes a stable magnetized state (g) at room temperature.

As the medium then rises in temperature from the magnetized state (g) at room temperature, the coercive force of the second magnetic layer 2 gradually decreases and the medium assumes the magnetized state (h). If the medium falls in temperature from this state, it will again assume the magnetized state (g). When the medium rises in temperature from the magnetized state (h) and reaches a temperature in the vicinity of the curie temperature $T_{L3}$ (a temperature at which the first kind of recording is effected), the coercive force of the vicinity of the interface of the second magnetic layer 2 with the third magnetic layer 3 decreases greatly and the exchange interaction between the second magnetic layer 2 and the third magnetic layer 3 becomes small, and the direction of magnetization of the third magnetic layer 3 is turned downwardly by the bias magnetic field $H_B$ and an interfacial magnetic wall 20 is formed near the interface of the second magnetic layer 2 with the third magnetic layer 3, and the medium assumes the magnetized state (i). When the temperature rise is stopped here and the temperature fall begins, the magnetization of the previously formed interfacial magnetic wall 20 increases and the exchange interaction becomes great. At this time, as described above, the temperature of the first magnetic layer 1 is high as compared with the other layers and the coercive force of the first magnetic layer 1 is small and therefore, the direction of magnetization of the second magnetic layer 2 is reversed into a downward direction so as to be stable relative to the direction of magnetization of the third magnetic layer 3 and simultaneously therewith, the direction of magnetization of the first magnetic layer 1 is also reversed into an upward direction by the exchange interaction, and the medium assumes the stable magnetized state (b). The medium further falls in temperature and assumes the stable magnetized state (a) at room temperature.

When the medium assumes a temperature in the vicinity of the curie temperature $T_{L1}$ (a temperature at which the second kind of recording is effected) from the stable magnetized state (g) at room temperature via the magnetized states (h) and (i), the vicinity of the interface of the second magnetic layer 2 with the third magnetic layer 3 becomes a normal magnetic layer 21 and the medium assumes the magnetized state (d) in which the direction of magnetization of the third magnetic layer 3 has been reversed into a downward direction. When the temperature falls from this state, the medium reaches the magnetized state (g) at room temperature, as described above.

As has hitherto been described, even if start is made from any of the two magnetized states (a) and (g) stable at room temperature, the medium rises in temperature to the vicinity of the curie temperature $T_{L3}$ and then falls in temperature (the first kind of recording), whereby the medium assumes the magnetized state (a) at room temperature. Likewise, even if start is made from any of the magnetized states (a) and (g) stable at room temperature, the medium rises in temperature to the vicinity of the curie temperature $T_{L1}$ and then falls in temperature (the second kind of recording), whereby the medium assumes the magnetized state (g) at room temperature. That is, by applying different laser power and selecting whether the medium rises in temperature to the vicinity of $T_{L3}$ or the vicinity of $T_{L1}$, it is possible to select a different magnetized state irrespective of the magnetized state before the laser power is applied, and thus, overwriting is realized.

Figure 2:
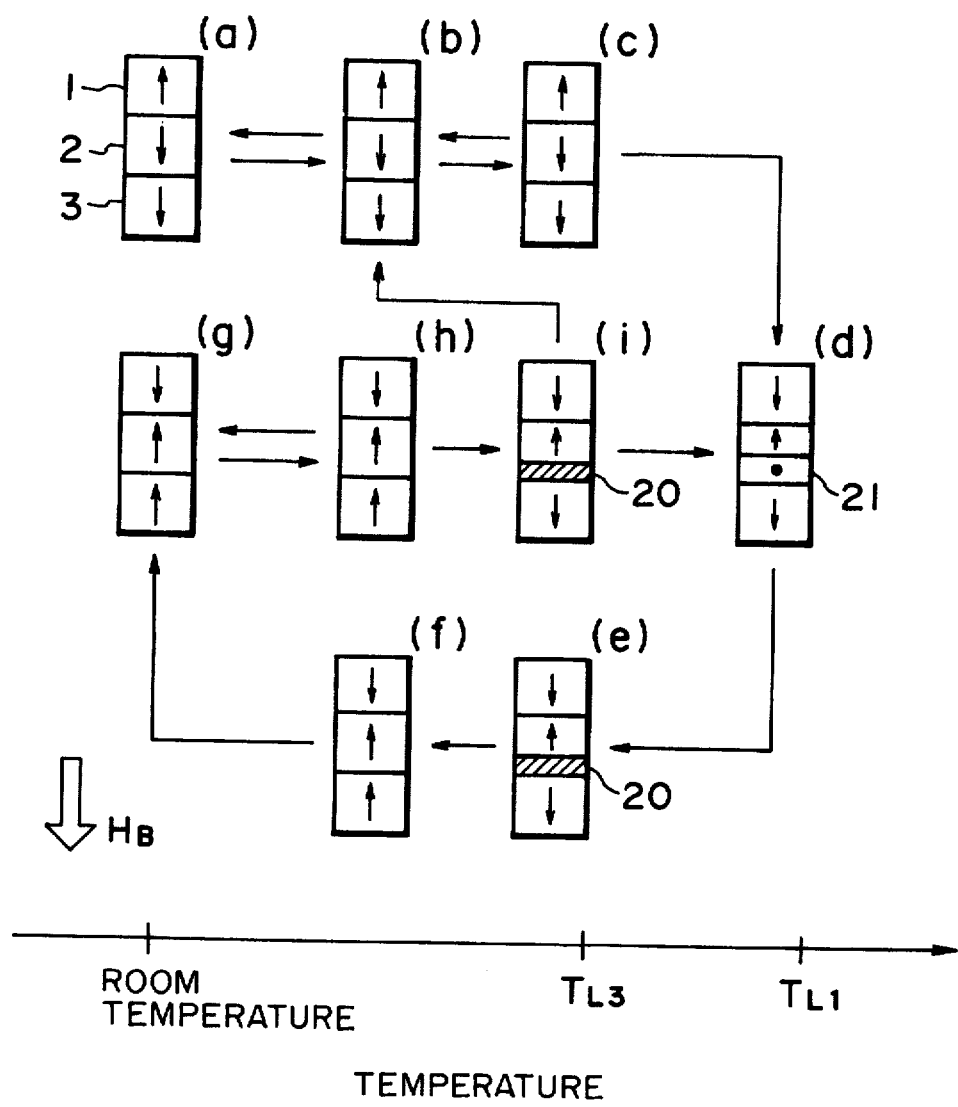
FIG. 2 shows the recording process when two-value recording is effected on the magneto-optical recording medium shown in FIG. 1.
Figure 3:
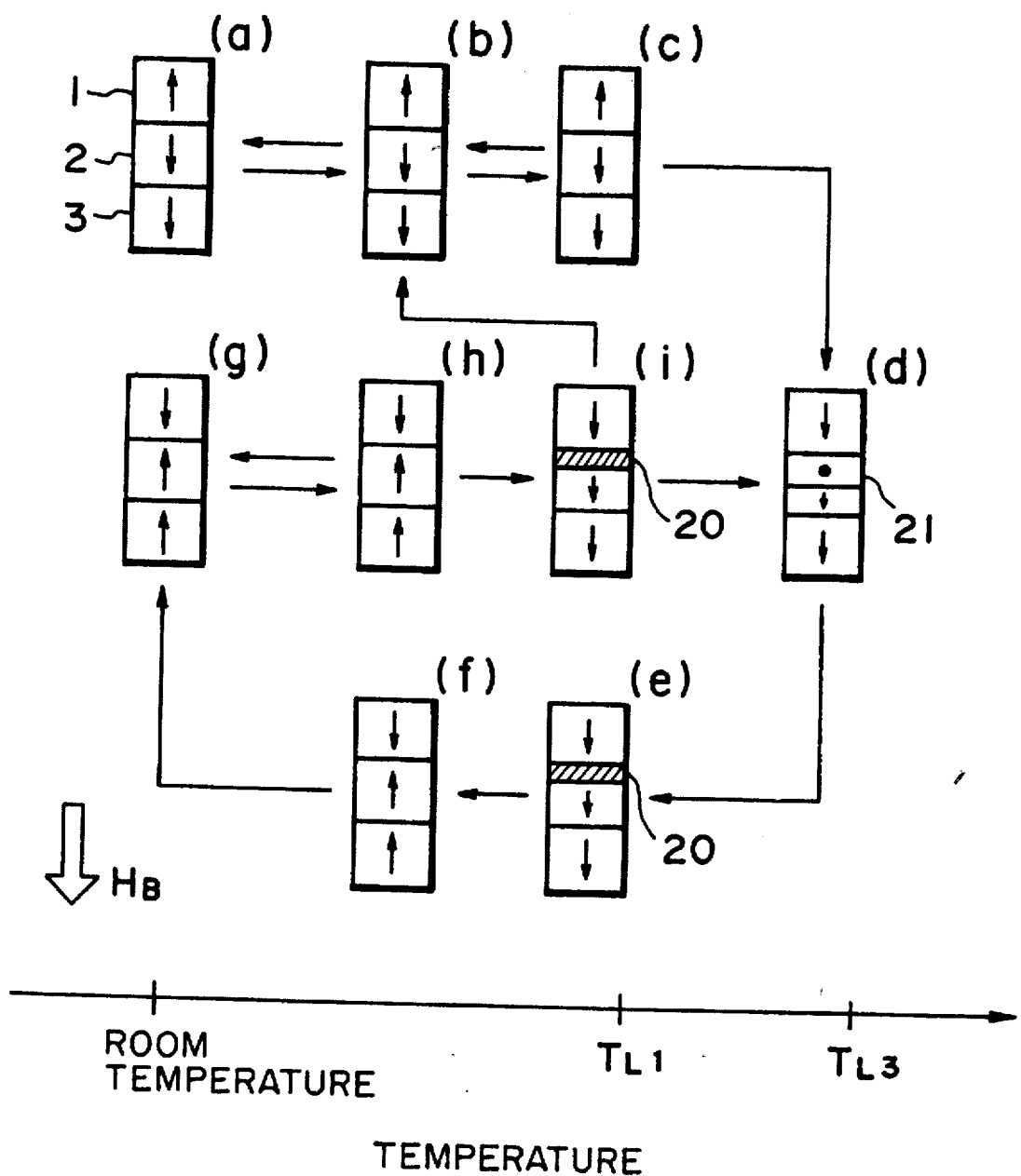
FIGS. 3, 4 and 5 show second, third and fourth embodiments, respectively, of the present invention.

FIG. 3 shows a second embodiment of the present invention. FIG. 2 shows the recording process under the condition that $T_{L3}<T_{L1}$, whereas FIG. 3 illustrates the recording process under the condition that $T_{L1}<T_{L3}$. It is to be understood that the laser beam likewise enters from the first magnetic layer 1 side.

Again in FIG. 3, the magnetized states (i) and (e) differ from each other in whether the medium is in the temperature-rising process or in the temperature-falling process. In the case of this embodiment, the laser beam enters from the first magnetic layer 1 and therefore, the temperature of the first magnetic layer at the point of time whereat the interfacial magnetic wall 20 is formed near the interface of the second magnetic layer 2 with the first magnetic layer 1 is higher in the state (i) in which the medium is in the temperature-rising process than in the state (e) in which the medium is in the temperature-falling process. Further, the difference of FIG. 3 from FIG. 2 is that the interfacial magnetic wall 20 is formed on the first magnetic layer 1 side from which the laser beam enters and therefore at the point of time whereat the interfacial magnetic wall 20 is formed, the vicinity of the interface of the third magnetic layer 3 with the second magnetic layer 2 is in a state in which the temperature does relatively not rise (the magnetized state (i)), and the vicinity of the interface of the third magnetic layer 3 with the second magnetic layer 2 is rather at a higher temperature in the temperature-falling process (the magnetized state (e)) in which the heat generated in the first magnetic layer 1 diffuses. Accordingly, when the temperature falls from the magnetized state (i), the coercive force of the vicinity of the interface of the second magnetic layer 2 with the third magnetic layer 3 is great and the second magnetic layer 2 is strongly exchange-coupled to the third magnetic layer 3, whereas the coercive force of the first magnetic layer 1 is small and therefore, the direction of magnetization of the first magnetic layer 1 is reversed into an upward direction and the interfacial magnetic wall 20 disappears, and the stable magnetized state (b), is brought about and the temperature further falls and the medium assumes the magnetized state (a) at room temperature. On the other hand, the medium of the present invention and conditions can be suitably set so that when the temperature falls from the magnetized state (e), the temperature of the first magnetic layer 1 is low and the coercive force of this layer 1 is great and the coercive force of the vicinity of the interface of the second magnetic layer 2 with the third magnetic layer 3 is high, as compared with the magnetized state (i), and therefore the coercive force of the vicinity of the interface of the second magnetic layer 2 with the third magnetic layer 3 is relatively small and the exchange-coupling force between the second magnetic layer 2 and the third magnetic layer 3 is relatively small and thus, the direction of magnetization of the second magnetic layer 2 is reversed into an upward direction and at the same time, the direction of magnetization of the third magnetic layer 3 is also reversed into an upward direction and the interfacial magnetic wall 20 disappears and the stable magnetized state (f) is brought about. The temperature further falls to bring about the magnetized state (g) at room temperature. In the magnetized state (h), the temperature further rises and when the temperature reaches the vicinity of the curie temperature $T_{L1}$, the coercive force of the second magnetic layer 2 decreases greatly and the exchange-coupling force between the first magnetic layer 1 and the second magnetic layer 2 becomes small and therefore, the directions of magnetization of the second magnetic layer 2 and the third magnetic layer 3 are reversed into a downward direction at a time, and an interfacial magnetic wall 20 is formed near the interface of the second magnetic layer 2 with the first magnetic layer 1, whereby the magnetized state (i) is brought about.

Figure 4:
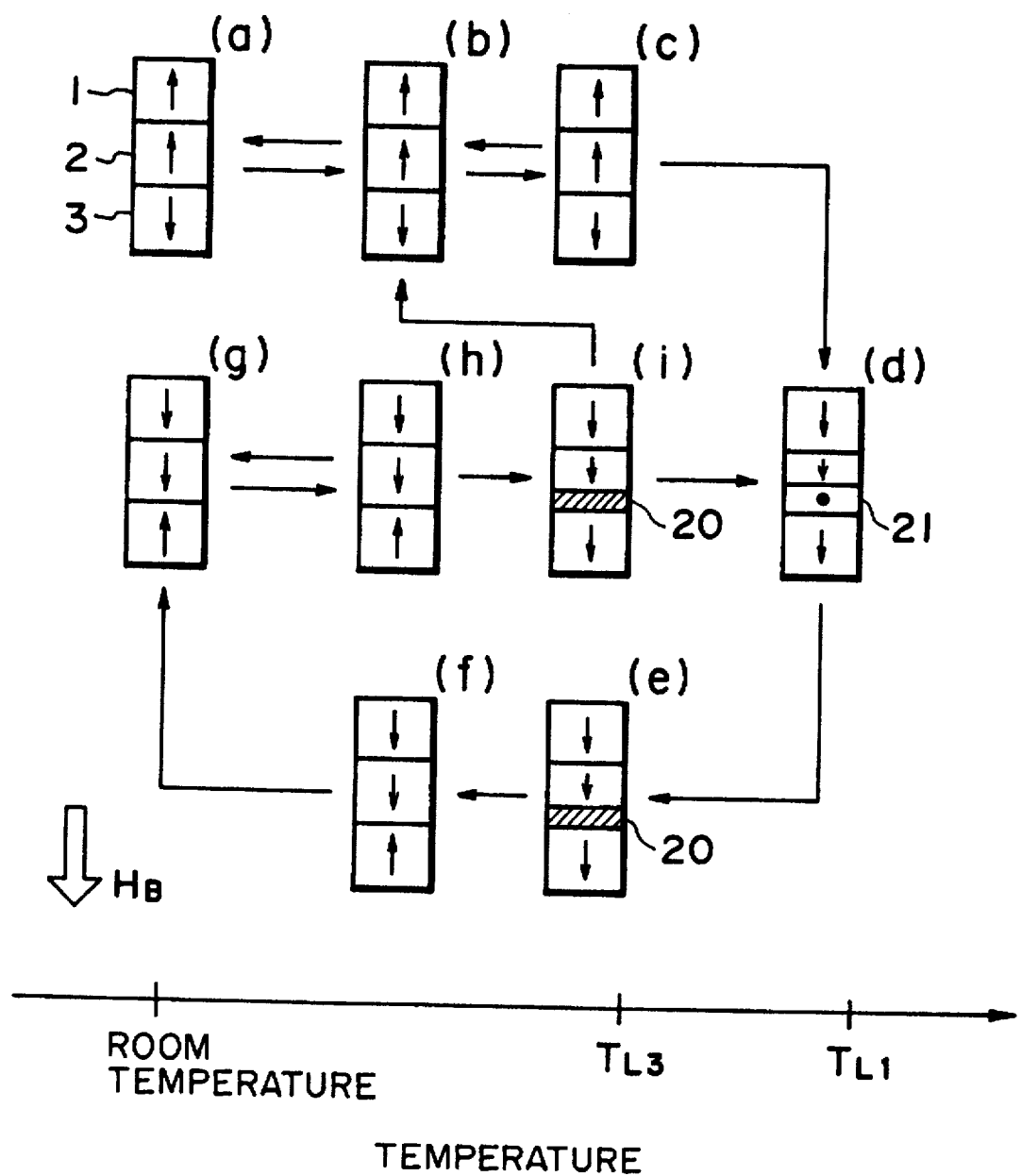

FIG. 4 shows a third embodiment of the present invention, and illustrates an example in which the state in which, in FIG. 2, the direction of magnetization of the second magnetic layer 2 is the opposite direction is stable, i.e., the recording process when the state in which the directions of magnetization of the first magnetic layer 1 and the second magnetic layer 2 are parallel to each other and the directions of magnetization of the second magnetic layer 2 and the third magnetic layer 3 are anti-parallel to each other is stable. Again in this embodiment, the laser beam enters from the first magnetic layer 1 side and recording is accomplished by a recording process similar to that of FIG. 2.

Figure 5:
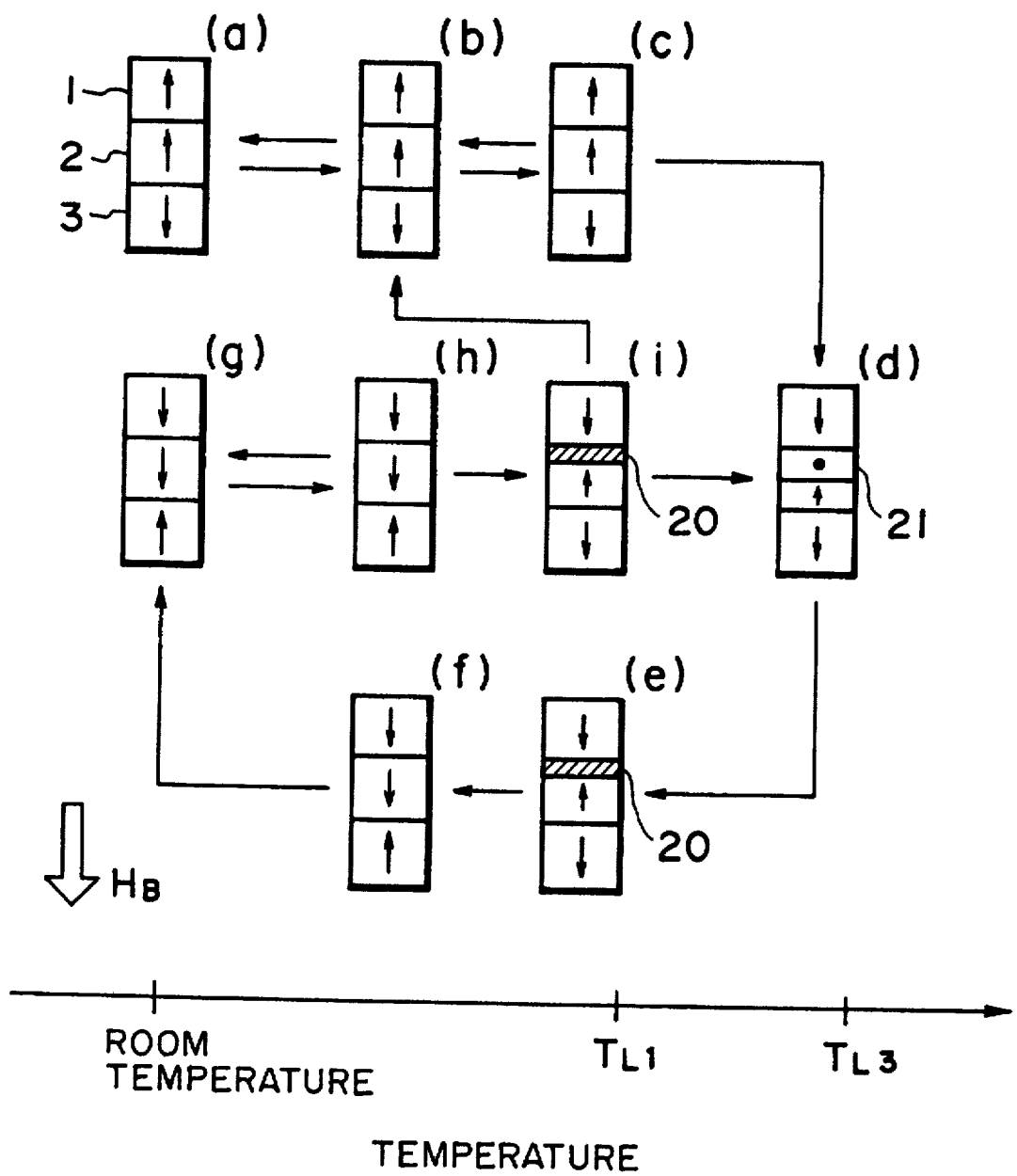

FIG. 5 shows a fourth embodiment of the present invention, and illustrates an example in which the state in which, in FIG. 3, the direction of magnetization of the second magnetic layer 2 is the opposite direction is stable, i.e., the recording process when the state in which the directions of magnetization of the first magnetic layer 1 and the second magnetic layer 2 are parallel to each other and the directions of magnetization of the second magnetic layer 2 and the third magnetic layer 3 are anti-parallel to each other is stable. Again in this embodiment, the laser beam enters from the first magnetic layer 1 side, and recording is accomplished by a recording process similar to that of FIG. 3.

Figure 6:
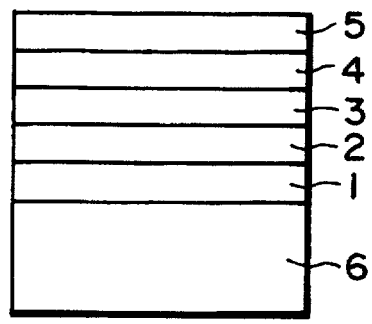
FIG. 6 shows a fifth embodiment of the magneto-optical recording medium of the present invention.

FIG. 6 shows a fifth embodiment of the present invention, and the difference of this embodiment from the above-described first embodiment is that an intermediate layer of relatively small heat conductivity and a heat radiation layer of great heat conductivity are laminated on the third magnetic layer.

The intermediate layer should desirably be of the light-transmitting property for the laser beam used in recording and reproduction, and as the dielectric material, use is made of SiO, $SiO_2$, ZnS, ZnSe, $Al_2O_3$, AlN, $Si_3N_4$, TiN or the like, and as the semiconductive material, use is made of Si, SiC or the like. The film thickness of the intermediate layer may preferably be of the order of 50–5000 Å as will be described later.

As the heat radiation layer, use may desirably be made of chiefly a metallic material such as Al, Cu, Au, Ti, Fe, Co or an alloy composed of chiefly these metals. The film thickness of the heat radiation layer may preferably be of the order of 200–1000 Å as will be described later.

As regards the first magnetic layer, the second magnetic layer and the third magnetic layer, there is no difference from the construction of the above-described first embodiment.

Figure 7:
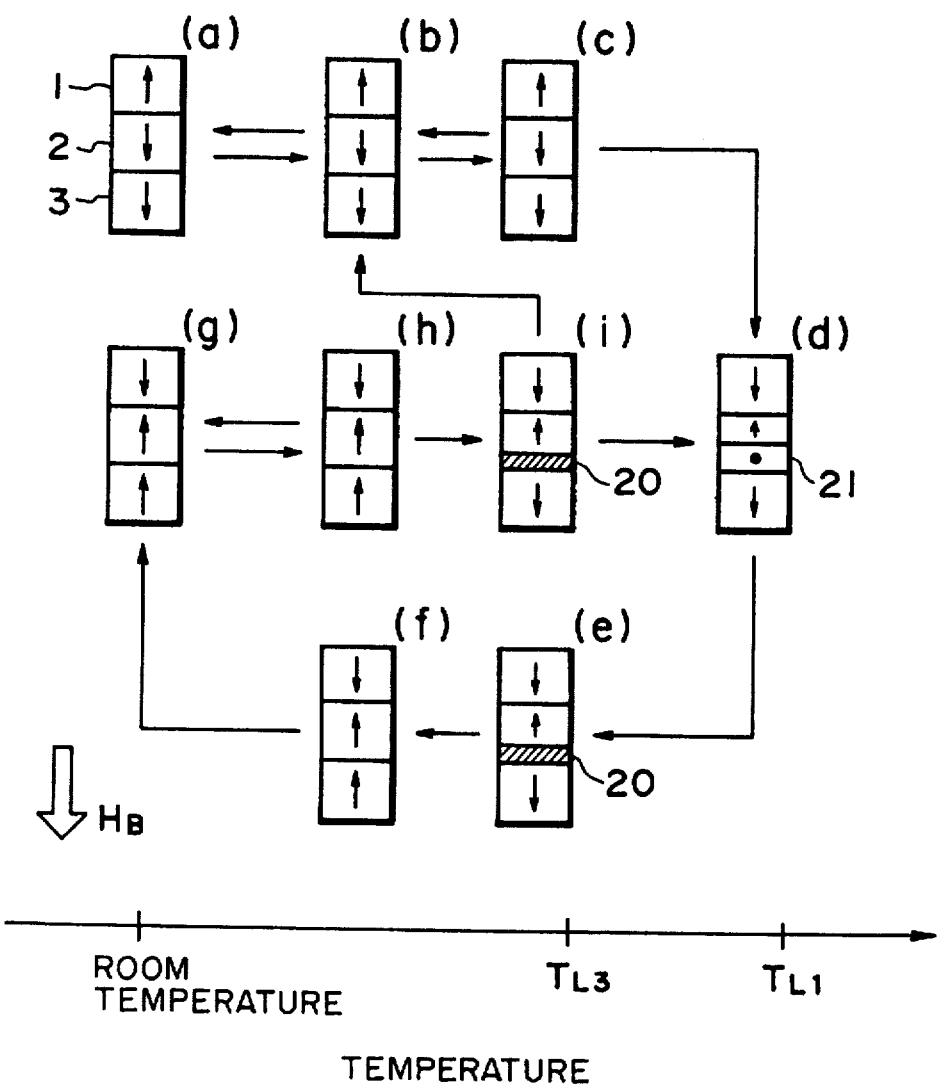
FIG. 7 shows the recording process when two-value recording is effected on the magneto-optical recording medium shown in FIG. 6.

Two-value recording effected on the magneto-optical recording medium of the fifth embodiment will now be described with reference to FIG. 7. FIG. 7 schematically shows variations in the directions of magnetization of the magnetic layers 1, 2 and 3. In this embodiment, the state in which at room temperature, the directions of magnetization of the first magnetic layer 1 and the second magnetic layer 2 are anti-parallel to each other due to the exchange interaction therebetween is stable. Since at this time, the directions of magnetization of the first magnetic layer 1 and the third magnetic layer 3 are anti-parallel to each other, the directions of magnetization of the second magnetic layer 2 and the third magnetic layer 3 are parallel to each other.

Also, when the curie temperature $T_{L1}$ of the vicinity of the interface of the second magnetic layer 2 with the first magnetic layer 1 and the curie temperature $T_{L3}$ of the vicinity of the interface of the second magnetic layer 2 with the third magnetic layer 3 are compared with each other, $T_{L1} > T_{L3}$.

For description, it is to be understood that the direction of the bias magnetic field $H_B$ applied from the outside is the direction from the first magnetic layer 1 toward the third magnetic layer 3. As a matter of course, if the direction of the bias magnetic field $H_B$ is opposite, the directions of magnetization of the magnetic layers 1, 2 and 3 in the magnetized states (a)–(i) as they are all reversed explain the then recording process. The bias magnetic field $H_B$ has enough intensity to orient the directions of magnetization of the first magnetic layer 1 and the third magnetic layer 3 to the direction of this bias magnetic field $H_B$.

Description will first be made of magnetized states indicated by (a)–(i) in FIG. 7 and the shift process between the magnetized states.

(a) and (g) indicate the magnetized states at room temperature corresponding to two kinds of recording states, and stable magnetized states by the exchange interaction. This magneto-optical recording medium can be caused to rise in the temperatures of the magnetic layers 1, 2 and 3 by applying a laser beam thereto from the side of a transparent substrate 6. The magnetized states in which the temperatures of these magnetic layers 1, 2 and 3 are somewhat lower than $T_{L3}$ are (b), (f) and (h), the magnetized states in which the temperatures of the magnetic layers 1, 2 and 3 are in the vicinity of $T_{L3}$ are (c), (e) and (i), and the magnetized state in which the temperatures of the magnetic layers further rise to the vicinity of $T_{L1}$ is (d). The magnetized state at each temperature, as will be described later, is fixed at only one state depending on whether the medium is in the temperature-rising process in which the temperatures of the magnetic layers 1, 2 and 3 are rising with the laser beam applied thereto or whether the medium is in the temperature-falling process in which the temperatures of the magnetic layers 1, 2 and 3 are falling with the application of the laser beam terminated, and the magnetized state at room temperature before the temperature rise.

Figure 11:
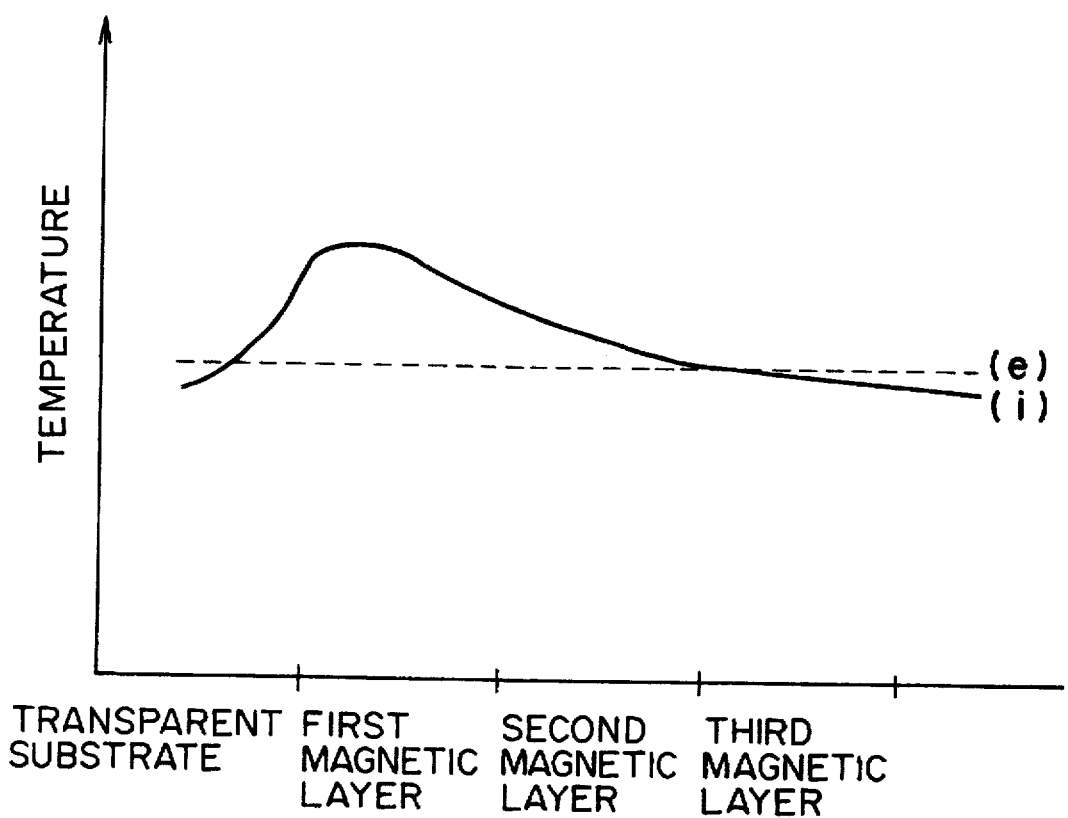
FIG. 11 graphically shows the temperature distributions of the magneto-optical recording medium in the recording process shown in FIG. 7 when the medium is in the temperature-rising process and when the medium is in the temperature-falling process.

Here, the magnetized states (i) and (e) will be described. The states (i) and (e) differ from each other in that (i) is in the temperature-rising process and (e) is in the temperature-falling process. The laser beam enters from the transparent substrate 6 side and therefore, the temperature of the first magnetic layer 1 when the laser beam is being applied is high as compared with the temperatures of the second magnetic layer 2 and the third magnetic layer 3. Heat generated in the magnetic layers 1, 2 and 3 by the laser beam impinging thereon flows through the intermediate layer of relatively small heat conductivity into the heat radiation layer of great heat-conductivity within a very short time. Accordingly, it is considered that when the application of the laser beam is terminated and the medium is in the temperature-falling process, the temperatures of the magnetic layers 1, 2 and 3 are substantially equal to one another. That is, when the temperatures of the first magnetic layer 1 in the magnetized states (i) and (e) at a point of time whereat an interfacial magnetic wall 20 has been formed near the interface of the second magnetic layer 2 with the third magnetic layer 3 are compared with each other, the temperature in the magnetized state (i) in which the medium is in the temperature-rising process is higher than the temperature in the magnetized state (e) in which the medium is in the temperature-falling process. The formation of the interfacial magnetic wall 20 is by the interaction between the second magnetic layer 2 and the third magnetic layer 3 and therefore, the temperatures of the third magnetic layer at this point of time in the states (i) and (e) are substantially equal to each other. FIG. 11 graphically shows the temperature distributions of the magnetic layers 1, 2 and 3 when the medium is in the temperature-rising process [when the medium is in the magnetized state (i); solid line] and when the medium is in the temperature-falling process [when the medium is in the magnetized state (e); broken line].

The magnetized states (i) and (e) are unstable states due to the exchange interaction because the directions of magnetization of the first magnetic layer 1 and the third magnetic layer 3 are parallel to each other. The magneto-optical recording medium of the present invention and conditions can be suitably set so that when the medium is cooled from these states into a stable state, as will be described later, the direction of magnetization of the first magnetic layer 1 may be reversed from the magnetized state (i) because the temperature of the first magnetic layer 1 is relatively high, and the direction of magnetization of the third magnetic layer 3 may be reversed from the magnetized state (e).

If the intermediate layer is made too thin or the heat radiation layer is made too thick, the heat by the application of the laser beam will momentarily escape into the heat radiation layer and the temperatures of the magnetic layers 1, 2 and 3 will not rise sufficiently, and the recording by the recording process which will be described later will not be effected. On the other hand, if the intermediate layer is made too thick or the heat radiation layer is made too thin, the flow of heat into the heat radiation layer will be limited and the effect of providing the heat radiation layer will be lost. As a result, the difference between the temperature of the first magnetic layer 1 in the above-described temperature-rising process [when the medium is in the magnetized state (i)] and the temperature of the first magnetic layer 1 in the temperature-falling process [when the medium is in the magnetized state (e)] will become small and good recording will be prevented. Thus, the film thickness of the intermediate layer may preferably be of the order of 50–5000 Å and the film thickness of the heat radiation layer may preferably be of the order of 200–1000 Å.

The recording process will now be described.

As the medium rises in temperature from the magnetized state (a) at room temperature, the coercive force of the second magnetic layer 2 gradually decreases and the medium comes to the magnetized state (c) at a temperature in the vicinity of the curie temperature $T_{L3}$ (a temperature at which the first kind of recording is effected) via the magnetized state (b). When the temperature falls from this state, the coercive force of the second magnetic layer 2 increases and the medium reversibly restores the state (a). When the temperature further rises the magnetized state (c) and reaches a temperature in the vicinity of the curie temperature $T_{L1}$ (a temperature at which the second kind of recording is effected), the medium assumes the magnetized state (d). At this temperature, the vicinity of the interface of the second magnetic layer 2 with the third magnetic layer 3 exceeds the curie temperature and therefore, this portion becomes a normal magnetic layer 21 and the coercive force of the second magnetic layer 2 as a whole becomes approximate to zero and thus, the direction of magnetization of the first magnetic layer 1 is reversed into a downward direction by the bias magnetic field $H_B$ and simultaneously therewith, the direction of magnetization of the second magnetic layer 2 near the interface thereof with the first magnetic layer 1 is also reversed into an upward direction by the exchange interaction.

When the temperature is reduced from this magnetized state (d) to a temperature in the vicinity of the curie temperature $T_{L3}$, the magnetization of the second magnetic layer 2 becomes great and the magnetized state (e) which exhibits a great coercive force is brought about near the interface of the second magnetic layer 2 with the first magnetic layer 1. At this temperature, the vicinity of the interface of the second magnetic layer 2 with the third magnetic layer 3 again assumes the curie temperature or below, and the directions of magnetization of the second magnetic layer 2 and the third magnetic layer 3 are anti-parallel to each other and unstable and therefore, an interfacial magnetic wall 20 is formed near said interface. When the temperature further falls, the temperature of the first magnetic layer 1 is not high as compared with the other magnetic layers because this time is the temperature-falling process, and the first magnetic layer 1 and the second magnetic layer 2 are strongly exchange-coupled together, and the coercive force of the vicinity of the interface of the second magnetic layer 2 with the first magnetic layer 1 is sufficiently great and therefore, the direction of magnetization of the third magnetic layer 3 is reversed into an upward direction and the interfacial magnetic wall 20 disappears, and the stable magnetized state (f) is brought about. When the temperature further falls to room temperature, there is brought about the magnetized state (g) stable at room temperature.

As the temperature then rises from the magnetized state (g) at room temperature, the coercive force of the second magnetic layer 2 gradually decreases and the magnetized state (h) is brought about. When the temperature falls from this state, there is again brought about the magnetized state (g). When the temperature rises from the magnetized state (h) to a temperature in the vicinity of the curie temperature $T_{L3}$ (a temperature at which the first kind of recording is effected), the coercive force of the vicinity of the interface of the second magnetic layer 2 with the third magnetic layer 3 decreases greatly and the exchange interaction between the second magnetic layer 2 and the third magnetic layer 3 also becomes small, and the direction of magnetization of the third magnetic layer 3 is turned downwardly and an interfacial magnetic wall 20 is formed near the interface of the second magnetic layer 2 with the third magnetic layer 3, and the magnetized state (i) is brought about. When hereupon the temperature rise is stopped and the temperature fall begins, the magnetization of the previously formed interfacial magnetic wall 20 increases and the exchange interaction becomes great. At this time, as described above, the temperature of the first magnetic layer 1 is high and the coercive force of the first magnetic layer is small as compared with the other magnetic layers and therefore, the direction of magnetization of the second magnetic layer 2 is reversed into a downward direction so as to be stable relative to the direction of magnetization of the third magnetic layer and simultaneously therewith, the direction of magnetization of the first magnetic layer 1 is also reversed into an upward direction by the exchange interaction, and the stable magnetized state (b) is brought about. The temperature further falls and the magnetized state (a) stable at room temperature is brought about.

When a temperature in the vicinity of the curie temperature $T_{L1}$ (a temperature at which the second kind of recording is effected) is reached from the magnetized state (g) at room temperature via the magnetized states (h) and (i), the vicinity of the interface of the second magnetic layer 2 with the third magnetic layer 3 becomes a normal magnetic layer 21 and there is brought about the magnetized state (d) in which the direction of magnetization of the third magnetic layer 3 has been reversed into a downward direction. When the temperature falls from this state, the magnetized state (g) at room temperature is reached as described above.

As has hitherto been described, even if start is made from any of the two magnetized states (a) and (g) stable at room temperature, the temperature rises to the vicinity of the curie temperature $T_{L3}$ and then falls (the first kind of recording), whereby the medium assumes the magnetized state (a) at room temperature. Likewise, even if start is made from any of the magnetized states (a) and (g) stable at room temperature, the temperature rises to the vicinity of the curie temperature $T_{L1}$ and then falls (the second kind of recording), whereby the medium assumes the magnetized state (g) at room temperature. That is, by applying different laser power and selecting whether the temperature rises to the vicinity of $T_{L3}$ or the vicinity of $T_{L1}$, it is possible to choose a different magnetized state irrespective of the magnetized state before the laser power is applied and thus, overwriting is realized.

Figure 8:
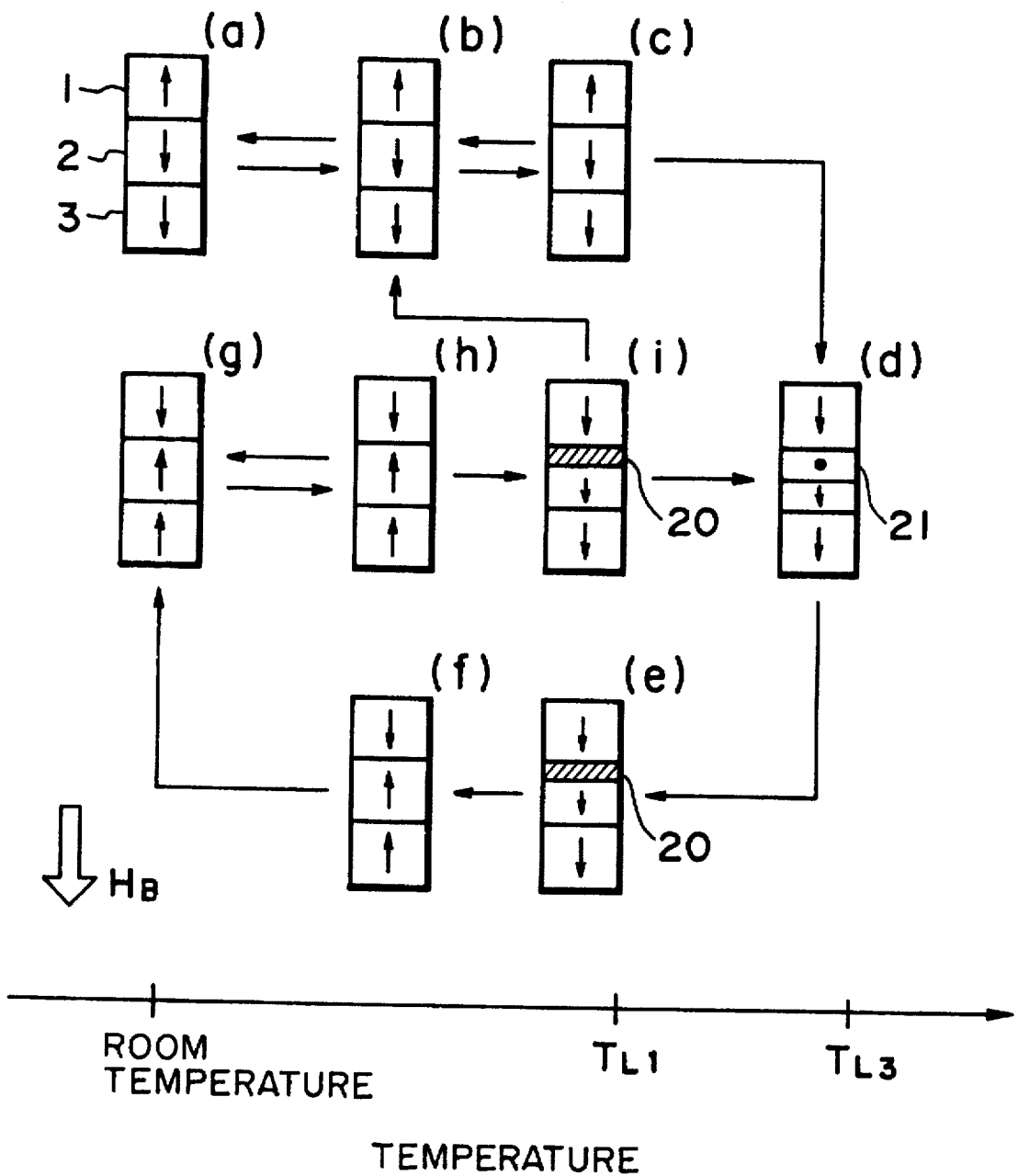
FIGS. 8, 9 and 10 show sixth, seventh and eighth embodiments, respectively, of the present invention.

FIG. 8 shows a sixth embodiment of the present invention, and in contrast with FIG. 7 which illustrates the recording process under the condition that $T_{L3}<T_{L1}$, FIG. 8 illustrates the recording process under the condition that $T_{L1}<T_{L3}$.

Again in the embodiment of FIG. 8, the magnetized states (i) and (e) differ from each other in whether the medium is in the temperature-rising process or in the temperature-falling process. The laser beam enters from the transparent substrate 6 side and therefore, as described above, when the medium is in the temperature-rising process, the temperature of the first magnetic layer 1 is higher than the temperature of the second magnetic layer 2 and the temperature of the second magnetic layer 2 is higher than the temperature of the third magnetic layer 3. On the other hand, when the medium is in the temperature-falling process, the temperatures of the magnetic layers 1, 2 and 3 are substantially equal to one another. The difference of the embodiment of FIG. 8 from the embodiment of FIG. 7 is that since $T_{L1}<T_{L3}$, an interfacial magnetic wall 20 is formed near the interface of the second magnetic layer 2 with the first magnetic layer 1. Considering in connection with the point of time at which the interfacial magnetic wall 20 is formed, when the medium is in the temperature-rising process, the vicinity of the interface between the third magnetic layer 3 and the second magnetic layer 2 is in a state in which the temperature has not risen [the magnetized state (i)] and rather, when the medium is in the temperature-falling process [the magnetized state](e), temperatures of the magnetic layers 1, 2 and 3 are substantially equal to one another and therefore, the vicinity of the interface between the third magnetic layer 3 and the second magnetic layer 2 is at a high temperature. Also, the temperature of the first magnetic layer 1 is higher in the magnetized state (i) than in the magnetized state (e). Accordingly, when the temperature falls from the magnetized state (i), the coercive force of the vicinity of the interface of the second magnetic layer 2 with the third magnetic layer 3 is great and the second magnetic layer 2 is strongly exchange-coupled to the third magnetic layer 3, whereas the coercive force of the first magnetic layer 1 is small and therefore, the direction of magnetization of the first magnetic layer 1 is reversed into an upward direction and the interfacial magnetic wall 20 disappears and there is brought about the stable magnetized state (b), and the temperature further falls to thereby bring about the magnetized state (a) at room temperature. On the other hand, the magneto-optical recording medium of the present invention and conditions can be suitably set so that when the temperature falls from the magnetized state (e), the temperature of the first magnetic layer 1 is low and the coercive force of this layer 1 is great and the temperature of the vicinity of the interface between the third magnetic layer 3 and the second magnetic layer 2 is high, as compared with the magnetized state (i), and therefore the coercive force of the vicinity of the interface of the second magnetic layer 2 with the third magnetic layer 3 is relatively small and the exchange-coupling force between the second magnetic layer 2 and the third magnetic layer 3 is relatively small and thus, the direction of magnetization of the second magnetic layer 2 is reversed into an upward direction and at the same time, the direction of magnetization of the third magnetic layer 3 is also reversed into an upward direction and the interfacial magnetic wall 20 disappears and the stable magnetized state (f) is brought about. The temperature further falls to bring about the magnetized state (g) at room temperature. In the magnetized state (h), when the temperature further rises therefrom to a temperature in the vicinity of the curie temperature $T_{L1}$, the coercive force of the second magnetic layer 2 decreases greatly and the exchange-coupling force between the first magnetic layer 1 and the second magnetic layer 2 also becomes small and therefore, the directions of magnetization of the second magnetic layer 2 and the third magnetic layer 3 are reversed into a downward direction at a time, and an interfacial magnetic wall 20 is formed near the interface of the second magnetic layer 2 with the first magnetic layer 1, and the magnetized state (i) is brought about.

Figure 9:
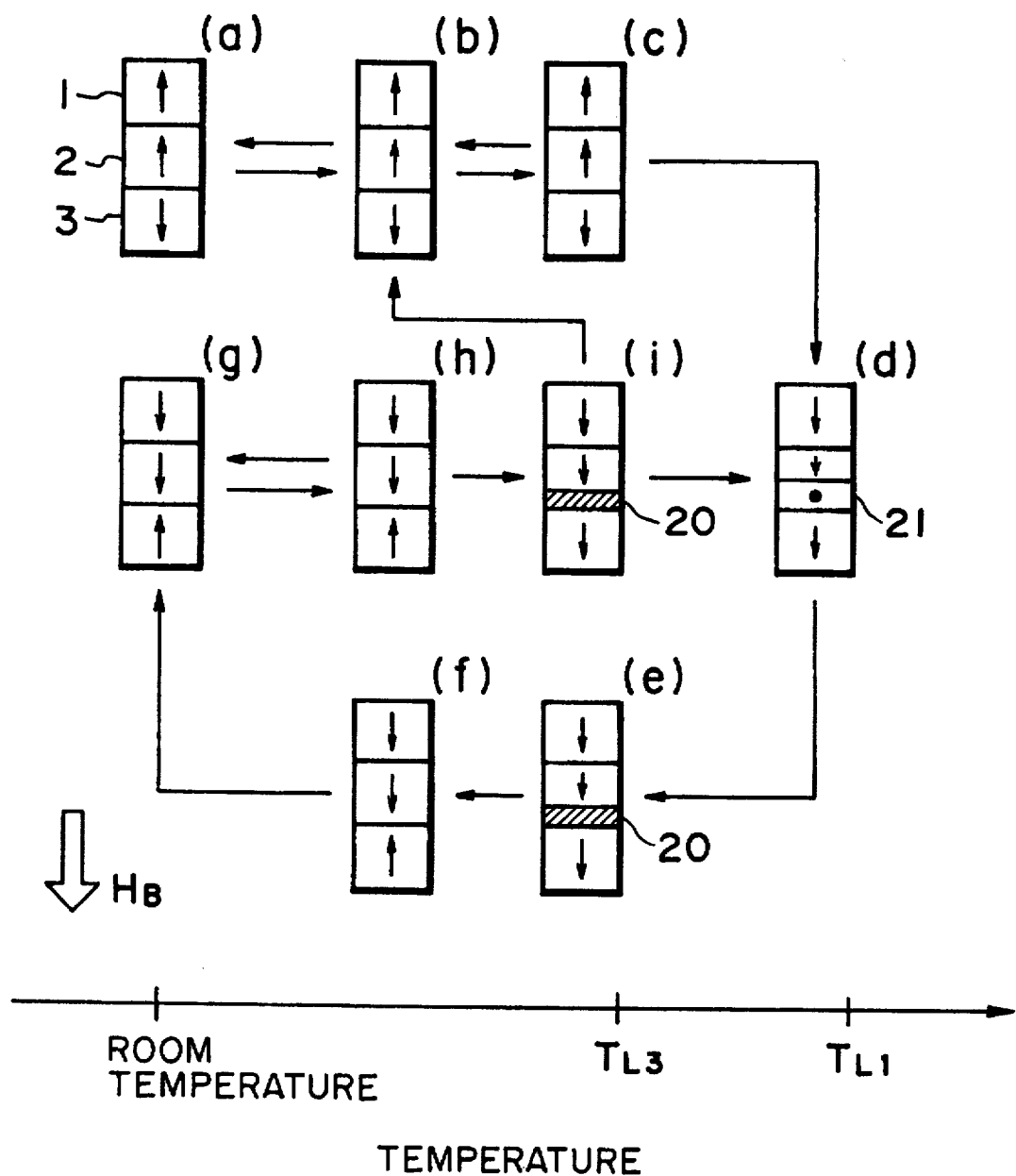

FIG. 9 shows a seventh embodiment of the present invention, and illustrates an example in which in FIG. 7, the state in which the direction of magnetization of the second magnetic layer 2 is a reverse direction is a stable state, that is, the recording process when the state in which the directions of magnetization of the first magnetic layer 1 and the second magnetic layer 2 are parallel to each other and the directions of magnetization of the second magnetic layer 2 and the third magnetic layer 3 are anti-parallel to each other is stable. Recording is accomplished by a recording process similar to that in FIG. 7.

Figure 10:
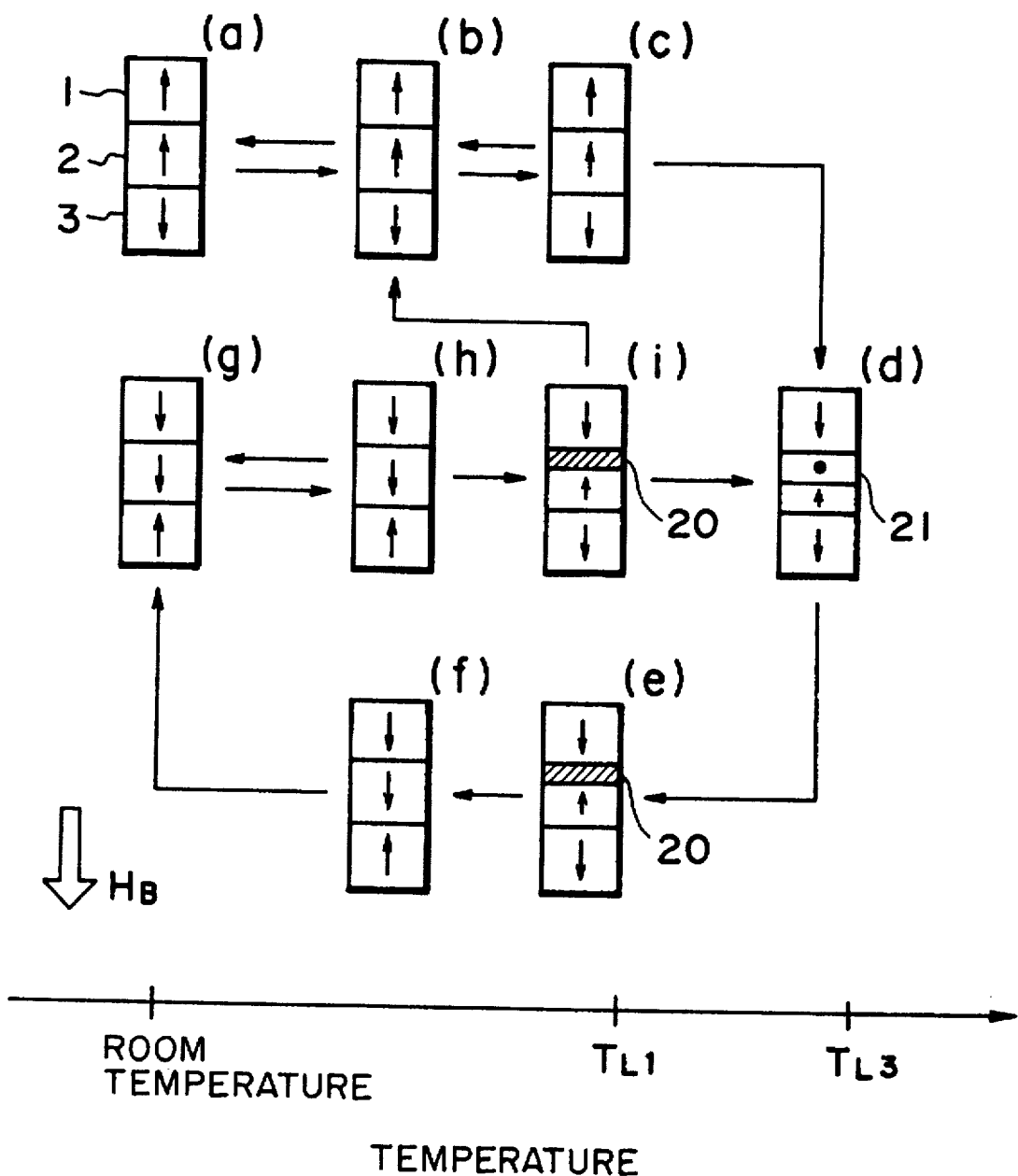

FIG. 10 shows an eighth embodiment of the present invention, and illustrates an example in which in FIG. 8, the state in which the direction of magnetization of the second magnetic layer 2 is a reverse direction is a stable state, that is, the recording process when the state in which the directions of magnetization of the first magnetic layer 1 and the second magnetic layer 2 are parallel to each other and the directions of magnetization of the second magnetic layer 2 and the third magnetic layer 3 are anti-parallel to each other is stable. Recording is accomplished by a recording process similar to that in FIG. 8.

As previously described, the direction of the bias magnetic field $H_B$ may be the direction from the third magnetic layer 3 toward the first magnetic layer 1.

Description will now be made of the result of the experiment carried out on the examples of the present invention and comparative examples.

EXAMPLE 1

In a sputtering apparatus provided with a six-element target source, a disk-like substrate of polycarbonate formed with a pregroove and a preformat signal was set so that the distance between it and the target might be 10 cm, and the substrate was rotated. In argon, from a first target, $Si_3N_4$ having a film thickness of 600 Å was provided as a protective layer on the substrate at a sputtering speed of 100 Å/min. and sputtering pressure of $5\times10^{-3}$ Torr. Subsequently, in the argon, from a second target, an alloy $Gd_{22}Fe_{78}$ was sputtered at a sputtering speed of 100 Å/min. and sputtering pressure of $5\times10^{-3}$ Torr to thereby form a first magnetic layer of the priority of subgrating magnetized Fe atoms having a film thickness of 300 Å, a curie temperature $T_{H1}$ of about 250° C. and a coercive force $H_{L1}$ of 200 Oe.

Subsequently, Tb, Fe and Co were sputtered at a time from a third target, a fourth target and a fifth target, respectively, at sputtering pressure of $5\times10^{-3}$ Torr to form a second magnetic layer. The sputtering speeds from the respective targets were adjusted so as to provide a composition $Tb_{24}Fe_{68}Co_{8}$ (the $Tb_{24}Fe_{68}Co_{8}$ film had the priority of subgrating magnetized Tb atoms, a curie temperature $T_{L1}$ of about 160° C. and a coercive force of 15 kOe or more) at the start of the film formation of the second magnetic layer (near the interface thereof with the first magnetic layer). The ratio of the sputtering speeds of Fe and Co was continuously varied so that the rate of Co atoms might increase, so as to provide a composition $Tb_{24}Fe_{51}Co_{25}$ (the $Tb_{24}Fe_{51}Co_{25}$ film had the priority of subgrating magnetized Tb atoms, a curie temperature $T_{L3}$ of about 220° C. and a coercive force of 15 kOe or more) at the termination of the film formation of the second magnetic layer. The film thickness of the second magnetic layer was 500 Å.

Subsequently, in the argon, an alloy $Gd_{25}Fe_{45}Co_{30}$ was sputtered from a sixth target at a sputtering speed of 100 Å/min. and sputtering pressure of $5\times10^{-3}$ Torr to thereby form a third magnetic layer of the priority of subgrating magnetized Gd atoms having a film thickness of 300 Å, a curie temperature $T_{H3}$ of about 270° C. and a coercive force $H_{L3}$ of 200 Oe.

Finally, in the argon, sputtering was effected from the first target at a sputtering speed of 100 Å/min. and sputtering pressure of $5\times10^{-3}$ Torr, whereby $Si_3N_4$ having a film thickness 600 Å was formed as a protective layer.

Next, by the use of a hot melt adhesive, the substrate on which said film was formed was sticked to a substrate of polycarbonate for sticking, to thereby make a magneto-optical disk.

The first, second and third magnetic layers are coupled together by the exchange interaction. In both of the first and third magnetic layers, the intensity of the bias magnetic field by the exchange force with the second magnetic layer (the force which turns the magnetization of the first and third magnetic layers in a stable direction relative to the second magnetic layer) was 1 kOe or more. That is, in a state in which at room temperature, there is no bias magnetic field from the outside, or under a bias magnetic field of 1 kOe or less from the outside, the first and third magnetic layers are magnetized in a direction stable relative to the magnetization of the second magnetic layer and there is no magnetic wall on the interfaces between the respective magnetic layers.

This magneto-optical disk was set in a recording-reproducing apparatus and a laser beam of a wavelength 830 nm condensed to a diameter of about 1.2 μm was applied thereto form the first magnetic layer side while a bias magnetic field $H_B$ of 300 Oe was applied from the outside and the disk was rotated at a line speed of 8 m/sec, and recording was effected with laser power of two values 4 mW and 8 mW while the laser beam was modulated at 2 MHz and duty ratio 50%. When thereafter, reproduction was effected with a laser beam of 1 mW applied to the disk, reproduction of a signal of two values could be accomplished and the C/N ratio thereof was about 52 dB.

Subsequently, after the above-described recording and reproduction were effected once again, recording was effected under the same laser power condition as that described above while the laser beam was modulated on the same track at 3 MHz. As a result, the signal of the previously recorded frequency (2 MHz) was not detected, but only a signal of a newly recorded frequency (3 MHz) was detected and it was confirmed that overwriting was possible. The C/N ratio was about 51 dB.

Next, the laser power for reproduction was increased and the same track was continuously reproduced for about fifteen minutes, whereafter the laser power for reproduction was restored to 1 mW and the deterioration of the C/N ratio of the reproduction signal was examined. As a result, it was found that the deterioration of the C/N ratio began from the laser power for reproduction of 3.2 mW or more.

EXAMPLE 2

Sample disks were made by sputtering in the same manner as Example 1 with the material compositions and film thicknesses of the magnetic layers changed. Thereafter, tests of recording and reproduction were carried out on the respective sample disks in the same manner as Example 1. The result of these tests is shown in Table 1 below.

The laser beam entered from the first magnetic layer side, and the C/N ratio is that for a signal recorded at a line speed 8 m/sec. by a laser beam modulated at 2 MHz and duty ratio 50%. Also, the maximum reproducing power, as described in Example 1, refers to laser power for reproduction from which the deterioration of the C/N ratio begins when the laser power for reproduction is increased.

As shown in Table 1, it has been found that recording is accomplished substantially stably even if various material compositions and film thicknesses are chosen for the first, second and third magnetic layers. Also, these values of the C/N ratio and the maximum reproducing power sufficiently stand practical use.

TABLE 1

|  | 1st magnetic layer | | | | 2nd magnetic layer | | | |
| --- | --- | --- | --- | --- | --- | --- | --- | --- |
|  | Composition | Film-thickness (Å) | $T_{H1}$ (°C.) | $H_{L1}$ (Oe) | Composition | Film-thickness (Å) | $T_{L1}$ (°C.) | $T_{L3}$ (°C.) | $H_H$ (Oe) |
| Example 1 | $Gd_{22}Fe_{78}$ | 300 | 250 | 200 | Tb—Fe—Co | 500 | 160 | 220 | 15000 or more |
| Example 2-1 | $Gd_{22}Fe_{78}$ | 300 | 250 | 200 | Dy—Fe—Co | 300 | 190 | 140 | 15000 or more |
| Example 2-2 | $Gd_{25}Fe_{45}Co_{30}$ | 200 | 270 | 200 | Gd—Tb—Fe—Co | 300 | 190 | 170 | 15000 or more |

TABLE 1-continued

| | | | | | | | | | |
|---|---|---|---|---|---|---|---|---|---|
| Example 2-3 | $Gd_{25}Fe_{45}Co_{30}$ | 300 | 270 | 200 | Gd—Tb—Fe—Co | 800 | 190 | 170 | 15000 or more |

| | 3rd magnetic layer | | | | | |
|---|---|---|---|---|---|---|
| | Composition | Film-thickness (Å) | $T_{H3}$ (°C.) | $H_{L3}$ (Oe) | C/N ratio (dB) | Max. Reproducing power (mW) |
| Example 1 | $Gd_{25}Fe_{45}Co_{30}$ | 300 | 270 | 200 | 52 | 3.2 |
| Example 2-1 | $Gd_{22}Fe_{78}$ | 300 | 250 | 200 | 51 | 2.6 |
| Example 2-2 | $Gd_{22}Fe_{78}$ | 400 | 250 | 200 | 50 | 2.6 |
| Example 2-3 | $Gd_{22}Fe_{78}$ | 250 | 250 | 200 | 51 | 3.1 |

EXAMPLE 3

In a sputtering apparatus provided with a seven-element target source, a disk like substrate of polycarbonate formed with a pregroove and a preformat signal was set so that the distance between it and the target might be 10 cm, and the substrate was rotated at a speed of 40 rotations per minute.

In argon, from a first target, $Si_3N_4$ having a film thickness of 800 Å was provided as a protective layer at a sputtering speed of 100 Å/min. and sputtering pressure of $5\times10^{-1}$ Pa.

Subsequently, in the argon, from a second target, an alloy $Gd_{22}Fe_{70}Co_8$ was sputtered at a sputtering speed of 100 Å/min. and sputtering pressure of $5'10^{-1}$ Pa to thereby form a first magnetic layer of the priority of subgrating magnetized Fe and Co atoms having a film thickness of 250 Å, a curie temperature $T_{H1}$ of about 290° C. and a coercive force of 200 Oe.

Next, in the argon, an alloy $Gd_{50}Tb_{50}$, Fe and Co were sputtered at a time from a third target, a fourth target and a fifth target, respectively, at sputtering pressure of $5\times10^{-1}$ Pa to thereby form a second magnetic layer. The sputtering speeds from the respective targets were adjusted so as to provide a composition $Gd_{12}Tb_{12}Fe_{72}Co_4$ (the-$Gd_{12}Tb_{12}Fe_{72}Co_4$ film had the priority of subgrating magnetized Gd and Tb atoms, a curie temperature $T_{L1}$ of about 170° C. and a coercive force of 150 kOe or more) at the start of the film formation of the second magnetic layer (near the interface thereof with the first magnetic layer. The ratio of the sputtering speeds of Fe and Co was continuously varied so that the rate of Co atoms might increase, so as to provide a composition $Gd_{12}Tb_{12}Fe_{53}Co_{23}$ (the $Gd_{12}Tb_{12}Fe_{53}Co_{23}$ film had the priority of subgrating magnetized Gd and Tb atoms, a curie temperature $T_{L3}$ of about 230° C. and a coercive force of 15 kOe or more) at the termination of the film formation of the second magnetic layer (near the interface thereof with a third magnetic layer). The film thickness of the second magnetic layer was 450 Å.

Subsequently, in the argon, an alloy $Gd_{15}Dy_{10}Fe_{45}Co_{30}$ was sputtered from a sixth target at a sputtering speed of 100 Å/min. and sputtering pressure of $5\times10^{-1}$ Pa to thereby form a third magnetic layer of the priority of subgrating magnetized Gd and Dy atoms having a film thickness of 300 Å, a curie temperature $T_{H3}$ of about 260° C. and a coercive force of 250 Oe.

Next, in the argon, sputtering was effected from the first target at a sputtering speed of 100 Å/min. and sputtering pressure of $5\times10^{-1}$ Pa to thereby form an intermediate layer of $Si_3N_4$ having a film thickness of 400 Å.

Finally, in the argon, sputtering was effected from a seventh target at a sputtering speed of 50 Å/min. and sputtering pressure of $5\times10^{-1}$ Pa to thereby form a heat radiation layer of Al having a film thickness of 600 Å.

Next, by the use of a hot melt adhesive, the substrate on which said layers were formed was sticked to a substrate of polycarbonate for sticking, to thereby make a magneto-optical disk.

The first, second and third magnetic layers are coupled together by the exchange interaction. In both of the first magnetic layer and the third magnetic layer, the exchange-coupling force thereof with the second magnetic layer at room temperature (the force which turns the magnetization of the first and third magnetic layers in a stable direction relative to the direction of magnetization of the second magnetic layer) was 1 kOe or more as converted into a bias magnetic field. That is, in a state in which at room temperature, a bias magnetic field is not applied, or a state in which a bias magnetic field of 1 kOe or less is applied, the magnetization of the first magnetic layer and the third magnetic layer is oriented in a direction stable relative to the direction of magnetization of the second magnetic layer and there is no magnetic wall on the interfaces between the respective magnetic layers.

This magneto-optical disk was set in a recording-reproducing apparatus and was rotated at a line speed of 8 m/sec., and a laser beam of a wavelength 830 nm having a spot diameter of about 1.2 µm was applied to the disk from the transparent substrate side thereof while a recording bias magnetic field of 300 Oe was applied to the disk, and this laser beam was modulated at 2 mHz and duty ratio 50%, whereby recording was effected with laser power of two values 4 mW and 8 mW. When thereafter a laser beam of 1 mW was applied to the disk and reproduction was effected, good reproduction of a signal of two values could be accomplished, and the C/N ratio was about 51 dB.

Subsequently, the above-described recording and reproduction were effected once again, whereafter recording was effected on the same track under the same laser power condition as that described above while the laser beam was modulated at 3 MHz. When reproduction was effected thereafter, the signal of the previously recorded frequency (2 MHz) was not detected, but only a signal of a newly recorded frequency (3 MHz) was detected, and it was found that overwriting was possible. The C/N ratio at this time was about 50 dB.

EXAMPLE 4

Magneto-optical disks were made by the sputtering method in the same manner as Example 3 with the material compositions and film thicknesses of the magnetic layers, the intermediate layer and the heat radiation layer changed. Thereafter, tests of recording and reproduction were carried out on the respective magneto-optical disks in the same manner as Example 3. It was confirmed that good overwriting could be accomplished on any of these magneto-optical disks. The result of these tests is shown in Table 2 below. The C/N ratio is that for a signal recorded by a laser beam modulated at 2 MHz and duty ratio 50% with the magneto-optical disks rotated at a line speed of 8 m/sec., and the two values of the laser power at this time are shown in the column of recording power in Table 2. Comparative Example 1 for Examples 3 and 4

In the same manner as Example 3, a magneto-optical disk was made by the sputtering method. Comparative Example 1-1 is of a construction in which the heat radiation layer is eliminated from Example 3, and Comparative Example 1-2 is of a construction in which the intermediate layer is eliminated from Example 3. In Comparative Example 1-1 which did not have the heat radiation layer, the value of laser power necessary to effect two-value recording could be small, but the range of laser power within which good recording could be accomplished was narrow and also, the C/N ratio was small as compared with Example 3. In Comparative Example 1-2, the intermediate layer was not provided and therefore, the speed of disappearance of heat energy to the heat radiation layer was great and the value of laser power necessary to effect two-value recording became great and also, recording noise became great and the C/N ratio was reduced probably because the shape of recording bits was unstable. The result when recording and reproduction similar to those in Example 3 were effected is shown in Table 2.

As is apparent from the foregoing, the magneto-optical recording mediums of the present invention shown in Examples 3 and 4-1 to 4-3 exhibit a good overwrite recording characteristic by the recording method of the present invention.

third magnetic layer laminated on the opposite surfaces of said second magnetic layer and each having a higher Curie temperature and a lower coercive force than said second magnetic layer, the first surface of said second magnetic layer being next to said first magnetic layer, and the second surface of said second magnetic layer being next to said third magnetic layer;

said second magnetic layer having a Curie temperature $T_{L1}$ near its first surface and a Curie temperature $T_{L3}$ near its second surface, the Curie temperature increasing in the direction of film thickness throughout substantially the entire second magnetic layer from the second surface toward the first surface, such that $T_{L1}$ is greater than $T_{L3}$; and said first magnetic layer, said second magnetic layer and said third magnetic layer being coupled together at room temperature by exchange interaction therebetween so as to be in a stable state in which the direction of magnetization of said first magnetic layer and the direction of magnetization of said third magnetic layer are anti-parallel to each other, wherein, when a light beam incident on the first magnetic layer heats the second magnetic layer to a temperature near $T_{L1}$ and the second magnetic layer is thereafter cooled, the directions of magnetization of the first and second magnetic layers are oriented in a direction that is stable with respect to the direction of magnetization of the third magnetic layer, and when a light beam incident on the first magnetic layer heats the second magnetic layer to a temperature near $T_{L3}$ and the second magnetic layer is thereafter cooled, the direction of magnetization of the third magnetic layer is oriented in a direction that is stable with respect to the directions of magnetization of the first and second magnetic layers.

TABLE 2

| | 1st magnetic layer | | | | 2nd magnetic layer | | | | |
|---|---|---|---|---|---|---|---|---|---|
| | Composition | Film-thickness (Å) | $T_{H1}$ (°C.) | $H_{L1}$ (Oe) | Composition | Film-thickness (Å) | $T_{L1}$ (°C.) | $T_{L3}$ (°C.) | $H_H$ (Oe) |
| Example 3 | $Gd_{22}Fe_{70}Co_8$ | 250 | 290 | 200 | Gd—Tb—Fe—Co | 450 | 170 | 230 | 15000 or more |
| Example 4-1 | $Gd_{22}Fe_{70}Co_8$ | 100 | 290 | 200 | Gd—Tb—Fe—Co | 200 | 170 | 230 | 15000 or more |
| Example 4-2 | $Gd_{15}Ho_{10}Fe_{45}Co_{30}$ | 200 | 250 | 300 | Tb—Fe—Co | 500 | 200 | 140 | 15000 or more |
| Example 4-3 | $Gd_{25}Co_{75}$ | 200 | 300 | 250 | Dy—Fe—Co | 300 | 150 | 200 | 15000 or more |
| Comp. Ex. 1-1 | $Gd_{22}Fe_{70}Co_8$ | 250 | 290 | 200 | Gd—Tb—Fe—Co | 450 | 170 | 230 | 15000 or more |
| Comp. Ex. 1-2 | $Gd_{22}Fe_{70}Co_8$ | 250 | 290 | 200 | Gd—Tb—Fe—Co | 450 | 170 | 230 | 15000 or more |

| | 3rd magnetic layer | | | | Intermediate layer | | Heat rad layer | | | |
|---|---|---|---|---|---|---|---|---|---|---|
| | Composition | Film-thickness (Å) | $T_{H3}$ (°C.) | $H_{L3}$ (Oe) | Composition | Film-thickness (Å) | Composition | Film-thickness (Å) | C/N ratio (dB) | Recording power (mW) |
| Example 3 | $Gd_{15}Dy_{10}Fe_{45}Co_{30}$ | 300 | 260 | 250 | $Si_3N_4$ | 400 | Al | 600 | 51 | 4–8 |
| Example 4-1 | $Gd_{15}Dy_{10}Fe_{45}Co_{30}$ | 100 | 260 | 250 | $Si_3N_4$ | 400 | Al | 600 | 52 | 3–6 |
| Example 4-2 | $Gd_{20}Fe_{80}$ | 300 | 240 | 200 | SiO | 250 | Au | 400 | 49 | 6.5–11 |
| Example 4-3 | $Gd_{25}Co_{75}$ | 200 | 300 | 250 | AlN | 300 | $Cu_{50}Ti_{50}$ | 500 | 50 | 3–7 |
| Comp. Ex. 1-1 | $Gd_{15}Dy_{10}Fe_{45}Co_{30}$ | 300 | 260 | 250 | $Si_3N_4$ | 400 | not provided | | 48 | 3–6 |
| Comp. Ex. 1-2 | $Gd_{15}Dy_{10}Fe_{45}Co_{30}$ | 300 | 260 | 250 | not provided | | Al | 600 | 42 | 7–14 |

What is claimed is:

1. A magneto-optical recording medium on which information is recorded by applying a light beam thereto, said medium comprising:

a second magnetic layer having a first surface, a second surface opposite the first surface, a Curie temperature and a coercive force, and a first magnetic layer and a 2. A magneto-optical recording medium according to claim 1, wherein the difference between said $T_{L1}$ and said $T_{L3}$ is of the order of 10°–150° C.

3. A magneto-optical recording medium according to claim 1, wherein the coercive force of said second magnetic layer is 3 kOe or more.

4. A magneto-optical recording medium according to claim 1, wherein the Curie temperatures of said first magnetic layer and said third magnetic layer are of the order of 100°–400° C., and the coercive forces of said first magnetic layer and said third magnetic layer are of the order of 0.05–3 kOe.

5. A magneto-optical recording medium according to claim 1, wherein said first magnetic layer, said second magnetic layer and said third magnetic layer each are formed of an amorphous alloy of rare earth elements and transition elements.

6. A magneto-optical recording medium on which information is recorded by applying a light beam thereto, said medium comprising:

a first magnetic layer, a second magnetic layer, a third magnetic layer, an intermediate layer and a heat radiation layer laminated in succession on a transparent substrate, said second layer having a first surface, a second surface opposite the first surface, a Curie temperature and a coercive force, said first magnetic layer and said third magnetic layer each having a higher Curie temperature and a lower coercive force than said second magnetic layer, the first surface of said second magnetic layer being next to said first magnetic layer, and the second surface of said second magnetic layer being next to said third magnetic layer, said intermediate layer being formed of a dielectric material or a semiconductive material having a small heat conductivity as compared with said magnetic layers, said heat radiation layer being formed of a material having a great heat conductivity as compared with said intermediate layer;

said second magnetic layer having a Curie temperature $T_{L1}$ near its first surface and a Curie temperature $T_{L3}$ near its second surface, the Curie temperature increasing in the direction of film thickness through substantially the entire second magnetic layer from the second surface toward the first surface such that $T_{L1}$ is greater than $T_{L3}$; and said first magnetic layer, said second magnetic layer and said third magnetic layer being coupled together at room temperature by the exchange interaction therebetween so as to be in a stable state in which the direction of magnetization of said first magnetic layer and the direction of magnetization of said third magnetic layer are anti-parallel to each other, wherein, when a light beam incident on the first magnetic layer heats the second magnetic layer to a temperature near $T_{L1}$ and the second magnetic layer is thereafter cooled, the directions of magnetization of the first and second magnetic layers are oriented in a direction that is stable with respect to the direction of magnetization of the third magnetic layer, and when a light beam incident on the first magnetic layer heats the second magnetic layer to a temperature near $T_{L3}$ and the second magnetic layer is thereafter cooled, the direction of magnetization of the third magnetic layer is oriented in a direction that is stable with respect to the directions of magnetization of the first and third magnetic layers.

7. A magneto-optical recording medium according to claim 6, wherein the difference between said $T_{L1}$ and $T_{L3}$ is of the order of 10°–150° C.

8. A magneto-optical recording medium according to claim 6, wherein the coercive force of said second magnetic layer is 3 kOe or more.

9. A magneto-optical recording medium according to claim 6, wherein the Curie temperatures of said first magnetic layer and said third magnetic layer are of the order of 100°–400° C., and the coercive forces of said first magnetic layer and said third magnetic layer are of the order of 0.05–3 kOe.

10. A magneto-optical recording medium according to claim 6, wherein said first magnetic layer, said second magnetic layer and said third magnetic layer each are formed of an amorphous alloy of rare earth elements and transition elements.

11. A magneto-optical recording medium according to claim 6, wherein said intermediate layer is formed of one of SiO, $SiO_2$, ZnS, ZnSe, $Al_2O_3$, AlN, $Si_3N_4$, TiN, Si and SiC.

12. A magneto-optical recording medium according to claim 6, wherein said heat radiation layer is formed of Al, Cu, Au, Ti, Fe or Co, or an alloy composed of chiefly these.

13. A magneto-optical recording medium according to claim 11, wherein the film thickness of said intermediate layer is of the order of 50–5000 Å.

14. A magneto-optical recording medium according to claim 12, wherein the film thickness of said heat radiation layer is of the order of 200–1000Å.

15. A magneto-optical recording method comprising:

providing a magneto-optical recording medium in which on the opposite surfaces of a second magnetic layer having a first surface, a second surface opposite the first surface, a Curie temperature and a coercive force, there are laminated a first magnetic layer and a third magnetic layer, each having a higher Curie temperature and a lower coercive force than said second magnetic layer, the first surface of the second magnetic layer being next to the first magnetic layer, and the second surface of the second magnetic layer being next to the third magnetic layer, said second magnetic layer having a Curie temperature $T_{L1}$ near its first surface and a Curie temperature $T_{L3}$ near its second surface, the Curie temperature increasing in the direction of film thickness throughout substantially the entire second magnetic layer from the second surface toward the first surface such that $T_{L1}$ is greater than $T_{L3}$, said first magnetic layer, said second magnetic layer, and said third magnetic layer being coupled together at room temperature by exchange interaction therebetween so as to be in a stable state in which the direction of magnetization of said first magnetic layer and the direction of magnetization of said third magnetic layer are anti-parallel to each other; and applying laser power to one side of said medium while also applying a bias magnetic field $H_B$ in a predetermined direction to said medium at the position of a recording head, thereby effecting the following two-value recording:

(a) a first kind of recording in which a first laser power which raises the temperature of said medium to the vicinity of the Curie temperature $T_{L3}$ is applied to said medium, whereby (i) the direction of magnetization of the magnetic layer that is opposite the side that the laser power impinges is made uniform in the direction of said bias magnetic field $H_B$ and (ii) the direction of magnetization of said magnetic layer on which the laser power impinges is made uniform in a direction that is stable relative to the direction of magnetization of said magnetic layer that is opposite the side that the laser power impinges; and (b) a second kind of recording in which a second laser power which raises the temperature of said medium to the vicinity of the Curie temperature $T_{L1}$ is applied to said medium, whereby (i) the direction of magnetization of the magnetic layer on which the laser power impinges is made uniform in the direction of said bias magnetic field $H_B$ and (ii) the direction of magnetization of said magnetic layer that is opposite the side that the laser power impinges is made uniform in a direction that is stable relative to the direction of magnetization of said magnetic layer on which the laser power impinges.

16. A magneto-optical recording method comprising:

providing a magneto-optical recording medium in which on a transparent substrate, there are successively laminated a first magnetic layer, a second magnetic layer having a first surface, a second surface opposite the first surface, a Curie temperature and a coercive force, a third magnetic layer, an intermediate layer formed of a dielectric material or a semiconductive material having a small heat conductivity as compared with said magnetic layers, and a heat radiation layer formed of a material having a great heat conductivity as compared with said intermediate layer, said first magnetic layer and said third magnetic layer each having a higher Curie temperature and a lower coercive force than said second magnetic layer, the first surface of said second magnetic layer being next to the first magnetic layer and the second surface of said second magnetic layer being next to the third magnetic layer, said second magnetic layer having a Curie temperature $T_{L1}$ near its first surface and a Curie temperature $T_{L3}$ near its second surface, the Curie temperature increasing in the direction of film thickness throughout substantially the entire second magnetic layer from the second surface toward the first surface, such that $T_{L1}$ is greater than $T_{L3}$, said first magnetic layer, said second magnetic layer and said third magnetic layer being coupled together at room temperature by the exchange interaction therebetween so as to be in a stable state in which the direction of magnetization of said first magnetic layer and the direction of magnetization of said third magnetic layer are anti-parallel to each other; and applying laser power to said medium from the side of said transparent substrate while applying a bias magnetic field $H_B$ in a predetermined direction to said medium at the position of a recording head, thereby effecting the following two-value recording:

(a) a first kind of recording in which a first laser power which raises the temperature of said magnetic layers to the vicinity of the Curie temperature $T_{L3}$ is applied to said medium, whereby (i) the direction of magnetization of said third magnetic layer is made uniform in the direction of said bias magnetic field $H_B$ and (ii) the direction of magnetization of said first magnetic layer is made uniform in a direction that is stable relative to the direction of magnetization of said third magnetic layer; and (b) a second kind of recording in which a second laser power which raises the temperature of said magnetic layers to the vicinity of the Curie temperature $T_{L1}$ is applied to said medium, whereby (i) the direction of magnetization of said first magnetic layer is made uniform in the direction of said bias magnetic field $H_B$ and (ii) the direction of magnetization of said third magnetic layer is made uniform in a direction that is stable relative to the direction of magnetization of said first magnetic layer.

17. A magneto-optical recording medium on which information is recorded by applying a light beam thereto, said medium comprising:

a second magnetic layer having a first surface, a second surface opposite the first surface, a Curie temperature and a coercive force, and a first magnetic layer and a third magnetic layer laminated on the opposite surfaces of said second magnetic layer and each having a higher Curie temperature and a lower coercive force than said second magnetic layer, the first surface of said second magnetic layer being next to said first magnetic layer, and the second surface of said second magnetic layer being next to said third magnetic layer;

said second magnetic layer having a Curie temperature $T_{L1}$ near its first surface and a Curie temperature $T_{L3}$ near its second surface, the Curie temperature increasing in the direction of film thickness throughout substantially the entire second magnetic layer from the first surface toward the second surface, such that $T_{L1} < T_{L3}$; and said first magnetic layer, said second magnetic layer and said third magnetic layer being coupled together at room temperature by exchange interaction therebetween so as to be in a stable state in which the direction of magnetization of said first magnetic layer and the direction of magnetization of said third magnetic layer are anti-parallel to each other, wherein, when a light beam incident on the first magnetic layer heats the second magnetic layer to a temperature near $T_{L1}$ and the second magnetic layer is thereafter cooled, the direction of magnetization of the first magnetic layer is oriented in a direction that is stable with respect to the directions of magnetization of the second and third magnetic layers, and when a light beam incident on the first magnetic layer heats the second magnetic layer to a temperature near $T_{L3}$ and the second magnetic layer is thereafter cooled, the directions of magnetization of the second and third magnetic layers are oriented in a direction that is stable with respect to the direction of magnetization of the first magnetic layer.

18. A magneto-optical recording medium on which information is recorded by applying a light beam thereto, said medium comprising:

a first magnetic layer, a second magnetic layer, a third magnetic layer, an intermediate layer and a heat radiation layer laminated in succession on a transparent substrate, said second layer having a first surface, a second surface opposite the first surface, a Curie temperature and a coercive force, said first magnetic layer and said third magnetic layer each having a higher Curie temperature and a lower coercive force than said second magnetic layer, the first surface of said second magnetic layer being next to said first magnetic layer, and the second surface of said second magnetic layer being next to said third magnetic layer, said intermediate layer being formed of a dielectric material or a semiconductive material having a small heat conductivity as compared with said magnetic layers, said heat radiation layer being formed of a material having a great heat conductivity as compared with said intermediate layer;

said second magnetic layer having a Curie temperature $T_{L1}$ near its first surface and a Curie temperature $T_{L3}$ near its second surface, the Curie temperature increasing in the direction of film thickness throughout substantially the entire second magnetic layer from the first surface toward the second surface such that $T_{L1}<T_{L3}$; and said first magnetic layer, said second magnetic layer and said third magnetic layer being coupled together at room temperature by the exchange interaction therebetween so as to be in a stable state in which the direction of magnetization of said first magnetic layer and the direction of magnetization of said third magnetic layer are anti-parallel to each other, wherein, when a light beam incident on the first magnetic layer heats the second magnetic layer to a temperature near $T_{L1}$ and the second magnetic layer is thereafter cooled, the direction of magnetization of the first magnetic layer is oriented in a direction that is stable with respect to the directions of magnetization of the second and third magnetic layers, and when a light beam incident on the first magnetic layer heats the second magnetic layer to a temperature near $T_{L3}$ and the second magnetic layer is thereafter cooled, the directions of magnetization of the second and third magnetic layers are oriented in a direction that is stable with respect to the direction of magnetization of the first magnetic layer.

19. A magneto-optical recording method comprising:

providing a magneto-optical recording medium in which on the opposite surfaces of a second magnetic layer having a first surface, a second surface opposite the first surface, a Curie temperature and a coercive force, there are laminated a first magnetic layer and a third magnetic layer, each having a higher Curie temperature and a lower coercive force than said second magnetic layer, the first surface of the second magnetic layer being next to the first magnetic layer, and the second surface of the second magnetic layer being next to the third magnetic layer, said second magnetic layer having a Curie temperature $T_{L1}$ near its first surface and a Curie temperature $T_{L3}$ near its second surface, the Curie temperature increasing in the direction of film thickness throughout substantially the entire second magnetic layer from the first surface toward the second surface, such that $T_{L1}<T_{L3}$, said first magnetic layer, said second magnetic layer, and said third magnetic layer being coupled together at room temperature by exchange interaction therebetween so as to be in a stable state in which the direction of magnetization of said first magnetic layer and the direction of magnetization of said third magnetic layer are anti-parallel to each other; and applying laser power to one side of said medium while also applying a bias magnetic field $H_B$ in a predetermined direction to said medium at the position of a recording head, thereby effecting the following two-value recording:

(a) a first kind of recording in which a first laser power which raises the temperature of said medium to the vicinity of the Curie temperature $T_{L1}$ is applied to said medium, whereby (i) the direction of magnetization of the magnetic layer that is opposite the side that the laser power impinges is made uniform in the direction of said bias magnetic field $H_B$ and (ii) the direction of magnetization of said magnetic layer on which the laser power impinges is made uniform in a direction that is stable relative to the direction of magnetization of said magnetic layer that is opposite the side that the laser power impinges; and (b) a second kind of recording in which a second laser power which raises the temperature of said medium to the vicinity of the Curie temperature $T_{L3}$ is applied to said medium, whereby (i) the direction of magnetization of the magnetic layer on which the laser power impinges is made uniform in the direction of said bias magnetic field $H_B$ and (ii) the direction of magnetization of said magnetic layer that is opposite the side that the laser power impinges is made uniform in a direction that is stable relative to the direction of magnetization of said magnetic layer on which the laser power impinges.

20. A magneto-optical recording method comprising:

providing a magneto-optical recording medium in which on a transparent substrate, there are successively laminated a first magnetic layer, a second magnetic layer having a first surface, a second surface opposite the first surface, a Curie temperature and a coercive force, a third magnetic layer, an intermediate layer formed of a dielectric material or a semiconductive material having a small heat conductivity as compared with said magnetic layers, and a heat radiation layer formed of a material having a great heat conductivity as compared with said intermediate layer, said first magnetic layer and said third magnetic layer each having a higher Curie temperature and a lower coercive force than said second magnetic layer, the first surface of the second magnetic layer being next to the first magnetic layer, and the second surface of the second magnetic layer being next to the third magnetic layer, said second magnetic layer having aa Curie temperature $T_{L1}$ near its first surface and a Curie temperature $T_{L3}$ near its second surface, the Curie temperature increasing in the direction of film thickness throughout substantially the entire second magnetic layer from the first surface toward the second surface, such that $T_{L1}<T_{L3}$, said first magnetic layer, said second magnetic layer and said third magnetic layer being coupled together at room temperature by the exchange interaction therebetween so as to be in a stable state in which the direction of magnetization of said first magnetic layer and the direction of magnetization of said third magnetic layer are anti-parallel to each other; and applying laser power to said medium from the side of said transparent substrate while applying a bias magnetic field $H_B$ in a predetermined direction to said medium at the position of a recording head, thereby effecting the following two-value recording:

(a) a first kind of recording in which a first laser power which raises the temperature of said magnetic layers to the vicinity of the Curie temperature $T_{L1}$ is applied to said medium, whereby (i) the direction of magnetization of said third magnetic layer is made uniform in the direction of said bias magnetic field $H_B$ and (ii) the direction of magnetization of said first magnetic layer is made uniform in a direction that is stable relative to the direction of magnetization of said third magnetic layer; and (b) a second kind of recording in which a second laser power which raises the temperature of said magnetic layers to the vicinity of the Curie temperature $T_{L3}$ is applied to said medium, whereby (i) the direction of magnetization of said first magnetic layer is made uniform in the direction of said bias magnetic field $H_e$ and (ii) the direction of magnetization of said third magnetic layer is made uniform in a direction that is stable relative to the direction of magnetization of said first magnetic layer.

* * * * *

UNITED STATES PATENT AND TRADEMARK OFFICE
CERTIFICATE OF CORRECTION

PATENT NO. : 5,604,046
DATED : February 18, 1997
INVENTOR(S) : YOICHI OSATO

It is certified that error appears in the above-indentified patent and that said Letters Patent is hereby corrected as shown below:

ON THE COVER PAGE:

AT [57] ABSTRACT:

Line 3, "curie" should read --Curie--.
Line 6, "curie" should read --Curie--.
Line 8, "curie" should read --Curie--.
Line 9, "curie" should read --Curie--.
Line 11, "curie" should read --Curie--.

COLUMN 2:

Line 17, "$\neq T_{L3}$," should read --$\neq T_{L3}$,--.
Line 37, "$\neq T_{L3}$," should read --$\neq T_{L3}$,--.
Line 50, "lower" should read --the lower--.

COLUMN 4:

Line 46, "$T_{L1} > T_{13}$." should read --$T_{L1} > T_{L3}$.--
Line 48, "$H_B$applied" should read --$H_B$ applied--.

COLUMN 16:

Line 6, "form" should read --to form--.

UNITED STATES PATENT AND TRADEMARK OFFICE
CERTIFICATE OF CORRECTION

PATENT NO. : 5,604,046

DATED : February 18, 1997

INVENTOR(S) : YOICHI OSATO

It is certified that error appears in the above-indentified patent and that said Letters Patent is hereby corrected as shown below:

COLUMN 17:

Line 27, "5'10$^{-1}$" should read --5 x 10$^{-1}$--.

COLUMN 18:

Line 17, "sticked" should read --stuck--.

COLUMN 19

Line 8, "Comparative" should read ¶Comparative--.

COLUMN 21

Line 36, "surface such" should read --surface, such--.

COLUMN 22

Line 38, "surface such" should read --surface, such--.

COLUMN 25

Line 2, "surface such" should read --surface, such--.

UNITED STATES PATENT AND TRADEMARK OFFICE
CERTIFICATE OF CORRECTION

PATENT NO. : 5,604,046

DATED :

INVENTOR(S) : February 18, 1997

YOICHI OSATO

It is certified that error appears in the above-indentified patent and that said Letters Patent is hereby corrected as shown below:

COLUMN 26

Line 28, "aa" should read --a--.
    Line 61, "$H_e$" should read --$H_B$--.

Signed and Sealed this

Nineteenth Day of August, 1997

Attest:

BRUCE LEHMAN

Attesting Officer     Commissioner of Patents and Trademarks